United States Patent
Mueck et al.

(10) Patent No.: US 11,258,873 B2
(45) Date of Patent: Feb. 22, 2022

(54) MULTI-ACCESS EDGE COMPUTING (MEC) ARCHITECTURE AND MOBILITY FRAMEWORK

(71) Applicant: Intel Corporation, Santa Clara, CA (US)

(72) Inventors: Markus Dominik Mueck, Unterhaching (DE); Dario Sabella, Munich (DE); Miltiadis Filippou, Munich (DE); Michael Faerber, Wolfratshausen (DE)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/646,486

(22) PCT Filed: Nov. 9, 2018

(86) PCT No.: PCT/US2018/060125
§ 371 (c)(1),
(2) Date: Mar. 11, 2020

(87) PCT Pub. No.: WO2019/094790
PCT Pub. Date: May 16, 2019

(65) Prior Publication Data
US 2020/0274942 A1 Aug. 27, 2020

Related U.S. Application Data

(60) Provisional application No. 62/584,365, filed on Nov. 10, 2017, provisional application No. 62/584,523, filed on Nov. 10, 2017.

(51) Int. Cl.
*H04L 29/08* (2006.01)
*H04L 67/561* (2022.01)
(Continued)

(52) U.S. Cl.
CPC .......... *H04L 67/2804* (2013.01); *H04L 67/12* (2013.01); *H04L 67/2842* (2013.01)

(58) Field of Classification Search
CPC . H04L 67/2804; H04L 67/12; H04L 67/2842; H04L 67/28
See application file for complete search history.

(56) References Cited

U.S. PATENT DOCUMENTS

2008/0104666 A1* 5/2008 Dillaway ................ H04L 63/12
726/2
2013/0211555 A1 8/2013 Lawson et al.
(Continued)

FOREIGN PATENT DOCUMENTS

WO WO-2019094790 A1 5/2019

OTHER PUBLICATIONS

"International Application Serial No. PCT US2018 060125, International Preliminary Report on Patentability dated May 22, 2020", 10 pgs.

(Continued)

*Primary Examiner* — Kim T Nguyen
(74) *Attorney, Agent, or Firm* — Schwegman Lundberg & Woessner, P.A.

(57) ABSTRACT

An architecture to allow the spatial separation of information sources, information processing, and information consumption using objects and tags, including in mobile/multi-access edge computing (MEC) communication environments, is disclosed. In an example, a request for information provided to a network entity (such as a MEC entity) results in the receipt of an object and a tag, as a device operates in an operational area of an information service. The object provides data for the information service, and the tag provides the metadata related to a context of the information service and the object from another entity, for (Continued)

another entity located within the operational area of the location service. The use of this object, including in the form of an application, data, or user object type, allows a transfer and use of data and context for the information service that is independent from the access network.

25 Claims, 25 Drawing Sheets

(51) Int. Cl.
     *H04L 67/12*      (2022.01)
     *H04L 67/568*      (2022.01)

(56)      References Cited

U.S. PATENT DOCUMENTS

2013/0258878 A1* 10/2013 Wakikawa ....... G08G 1/096758
                                                                                                                                                                     370/252
2017/0214747 A1    7/2017 Schulte et al.
2017/0288886 A1  10/2017 Atarius et al.
2019/0021033 A1*  1/2019 Liu ....................... H04W 36/08

OTHER PUBLICATIONS

"International Application Serial No. PCT/US2018/060125, International Search Report dated Feb. 18, 2019", 5 pgs.
"International Application Serial No. PCT/US2018/060125, Written Opinion dated Feb. 18, 2019", 10 pgs.

* cited by examiner

MULTI-ACCESS EDGE COMPUTING (MEC) ARCHITECTURE AND MOBILITY FRAMEWORK

PRIORITY CLAIM

This application is a U.S. National Stage Filing under 35 U.S.C. 371 from International Application No. PCT/US2018/060125, filed Nov. 9, 2018 and published in English as WO 2019/094790 on May 16, 2019, which claims the benefit of priority to U.S. Application Ser. No. 62/584,365, filed Nov. 10, 2017, and U.S. Application Ser. No. 62/584,523, filed Nov. 10, 2017, each of which is incorporated herein by reference in their entirety.

TECHNICAL FIELD

Embodiments described herein generally relate to multi-access edge computing (MEC) and related wireless communication systems, and in particular, to a MEC architecture enabling mobility and dynamically changing information services.

BACKGROUND

MEC (or mobile edge computing) encompasses architectures that enable cloud computing functionality or information technology (IT) services at network (e.g., cellular network) edges. MEC may reduce network congestion by moving applications, data, discovery, etc. closer to the user (e.g., mobile device, user equipment (UE), station (STA), etc.). Some MEC details dealing with security (e.g., both user security as well as application integrity), radio use, etc., have been promulgated by European Telecommunications Standards Institute (ETSI), such as described in the "Mobile Edge Computing Introductory Technical White Paper," published Sep. 1, 2014. A set of specifications and white papers providing further details and implementation use cases for MEC scenarios is being developed and published on an ongoing basis by ETSI as part of the ETSI MEC industry specification group (ISG).

MEC is intended to support developing mobile use cases of edge computing, to allow application developers and content providers to access computing capabilities and an IT service environment in dynamic settings at the edge of the network. Edge computing, at a more general level, refers to the movement of compute and storage resources closer to, or into, smart endpoint devices in order to optimize total cost of ownership, reduce application latency, improve service capabilities, and improve compliance with security or data privacy requirements. Edge computing may in some scenarios provide a cloud-like distributed service, which offers orchestration and management for applications among many types of storage and compute resources. Edge computing may be further integrated with use cases and technology developed for the Internet of Things (IoT) and Fog networking, as endpoint devices and gateways attempt to access network resources and applications at locations moved closer to the "edge" of the network.

In these and other settings, edge computing attempts to offer reduced latency, increased responsiveness, and more available computing power than offered in traditional cloud network services and wide area network connections. Despite the rapid activity occurring with the development of standards and architectures involving these technologies, many limitations and technical problems still exist in the design and use of IoT, MEC, and next-generation edge networks.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

Figure 1:
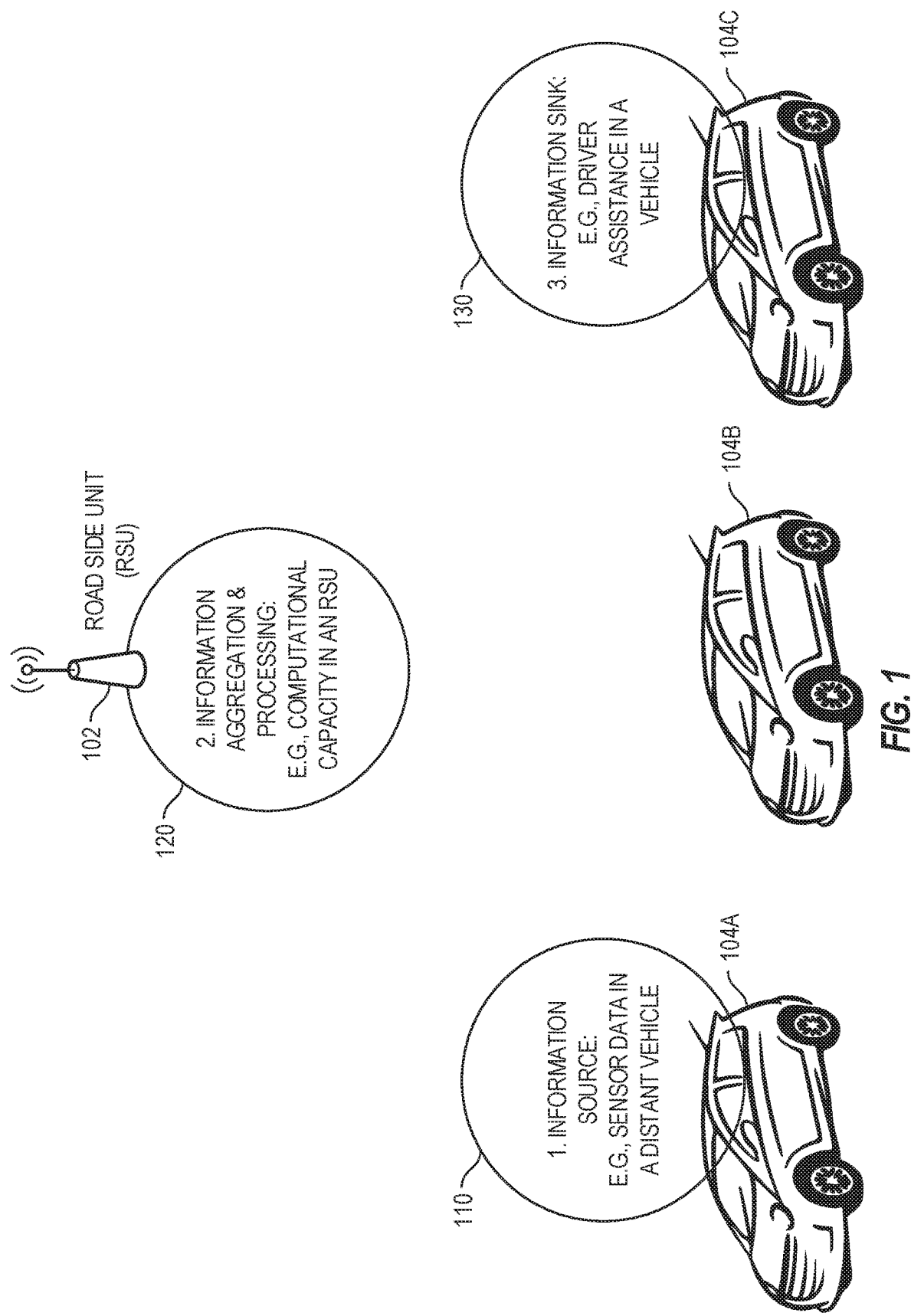
FIG. 1 illustrates an operational environment demonstrating separation of concerns for MEC functionality, according to an example.

In the following description, methods, configurations, and related apparatuses are disclosed for a MEC architecture configuration. As an overview, the problems addressed and solutions disclosed integrate MEC with various types of IoT or Fog networking implementations. These may benefit a variety of use cases, such as fifth generation (5G) network communications among automotive devices, including those use cases termed as vehicle-to-vehicle (V2V), vehicle-to-infrastructure (V2I), and vehicle-to-everything (V2X). As with most MEC installations, the goal with the present configurations is to bring the application endpoints as close to the vehicular environment, or other endpoints, as possible, to enable low latency or high bandwidth services. These systems and techniques may be implemented in, or augment, virtualized environments. These environments may be implemented within various types of MEC, network function virtualization (NFV), or fully virtualized 5G network environments.

As is understood, MEC architectures offer application developers and content providers cloud-computing capabilities and an IT service environment at the edge of the network. This environment offers ultra-low latency and high bandwidth throughput as well as real-time access to radio network information that may be leveraged by applications. MEC technology permits flexible and rapid deployments of innovative applications and services towards mobile subscribers, enterprises, or vertical segments. For example, regarding the automotive sector, applications such as V2X (e.g., IEEE 802.11p, or 3GPP LTE-V2X) exchange data, provide data to aggregation points, or access data in databases, to ascertain an overview of the local situation derived from a multitude of sensors (e.g., by various cars, roadside units, etc.).

The following describes spatial separation of information sources (e.g., a remote car providing sensor data), information processing (e.g., aggregation, classifying, etc.), and information consumption (e.g., an information sink to use the raw or processed data, such as a decision making entity for driving) using objects that facilitate a more flexible architecture than available with conventional cloud and internet-based services. Specifically, the presently described MEC architecture supports moving data and information processing nearer to users and endpoint devices to achieve more efficient network usage and processing cases. This is achieved, in some examples, with the use of information tags for different types of objects, to allow the consistent communication of specific object and context information among endpoints and processing nodes.

The following examples further address the problem of 5G communication mobility in presence of MEC systems. Embodiments are described to provide a MEC-aware mechanism to enable optimal criteria for 5G initial access and mobility management (e.g., cell-associations of User Equipment (UEs) and re-selections during handover procedures) exploiting the joint availability of communication and computation resources in the network. Such mobility techniques allow for the UEs that choose to instantiate (or migrate) an application to a MEC host (co-located with a radio evolved Node B (eNB)) to be informed of the frequently/infrequently changing parameters of candidate MEC hosts located within a tracking area (TA). These and other techniques are discussed within the context of the following examples and descriptions.

FIG. 1 illustrates an operational environment demonstrating a separation of concerns for MEC functionality, according to an example. The separation includes a device (e.g., forward distance sensor) in the first vehicle 104A producing information (e.g., operating as an information source 110). The data may be aggregated with data from other vehicles (104B, 104C) at a roadside unit (RSU) 102 (e.g., an edge computing node). The RSU 102 may then perform information aggregation and processing (e.g., with information aggregation and processing 120) to provide the aggregated data (e.g., when requested or periodically) to the third vehicle 104C. An information consumer (e.g., operating as an information sink 130) on the third vehicle 104C may then use the data to affect operations, such as to slow down (decelerate the vehicle) if the information data indicates a traffic jam or hazard that the vehicle is driving towards.

Implementing spatial separation amongst information creation, processing, and use is a notable challenge not addressed by existing technical implementations. Achieving a balance between overhead in discovering, storing, or forwarding data, and also available edge processing resources, or sink capabilities is difficult. An approach to this problem addressed by the present architecture involves tagging data with a class-specific tag. For example, class-specific tags of "DATA," "APPLICATION." or "USER" (or, the equivalent) may respectively denote source, processing, and sink entities within the architecture. By using the tags, there is a separation of DATA, APPLICATION, and USER objects in MEC or NFV environments. These objects may be spatially distributed throughout a network, including roadside or vehicle network nodes.

Figure 2:
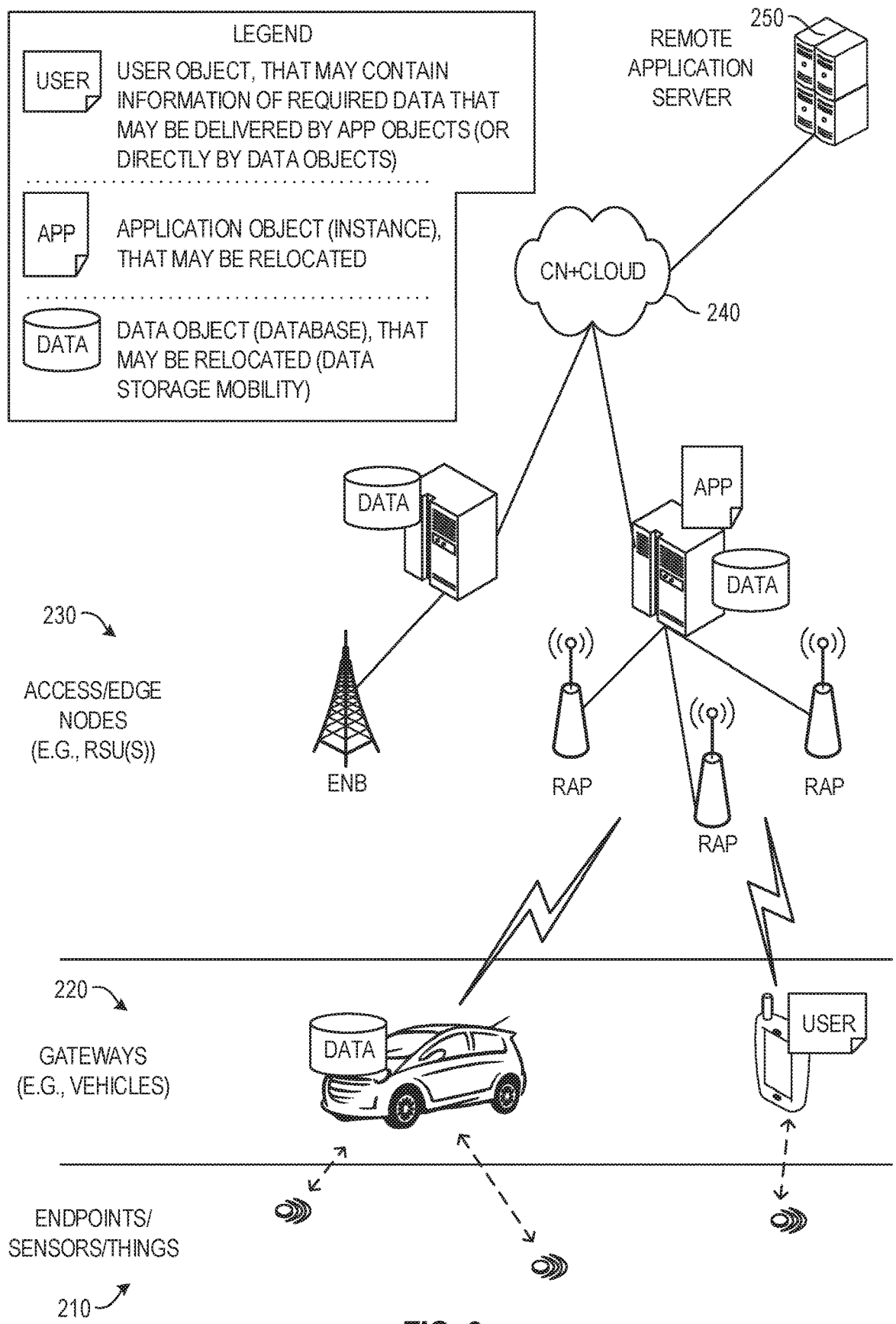
FIG. 2 illustrates a distribution of objects and network entities in a 5G automotive communications environment, according to an example.

FIG. 2 illustrates a distribution of objects and network entities in a 5G automotive communications environment, according to an example. This architecture is superior to previous attempts at data sharing among vehicles, for at least the following reasons. Existing techniques generally define a simple V2X communication interface without considering edge deployments and the mobility issues related to the spatial distribution of DATA. APPLICATION, and USER objects-often without considering that the sources, data processors, and sinks are on different devices moving in different ways through space. Other techniques only consider cloud computing resource management for heterogeneous resources but do not explicitly address the dynamic nature of many applications, such as automotive use cases. In such distributed contexts, existing attempts to enable edge communications generally perform poorly unless the sources, processors, and sinks are co-located (e.g., on the same device or in stable proximity to other devices). In contrast, the dynamic tagging of different data classes with the present techniques enables a flexible, responsive, and efficient technique for building distributed applications in highly dynamic environments.

FIG. 2 specifically illustrates the different layers of communication occurring within the network, starting from endpoint sensors or things 210 (e.g., operating in an IoT network topology); increasing in sophistication to gateways (e.g., vehicles) or intermediate nodes 220 which facilitate the collection and processing of data from endpoints 210; increasing in processing and connectivity sophistication to access or edge nodes 230 (e.g., road-side units operating as edge computing nodes), such as may be embodied by base stations (eNBs) roadside access points (RAPs), or servers; increasing in connectivity and processing sophistication to a core network or cloud setting 240. Indeed, the processing at the core network or cloud setting 240 may be enhanced by network services as performed by a remote application server 250 or other cloud services.

As shown, in the scenario of FIG. 2, the endpoints 210 communicate various types of information to the gateways or intermediate nodes 220; however, due to the mobility of the gateways or intermediate nodes 220 (such as in a vehicle or mobile computing device) this results in a data object or user object that may be relocated. At the access or edge nodes 230, various types of DATA objects, APPLICATION objects, and USER objects may be collected, accessed, and processed, but in a dynamic fashion as the different gateways 220 and endpoints 210 change location over time relative to the nodes 230 (often fixed in geographic location). Thus, despite the separation of data into USER objects, APPLICATION objects, and DATA objects, a large amount of spatial distribution will occur among the objects and processing/consuming devices in real-world settings.

Figure 3:
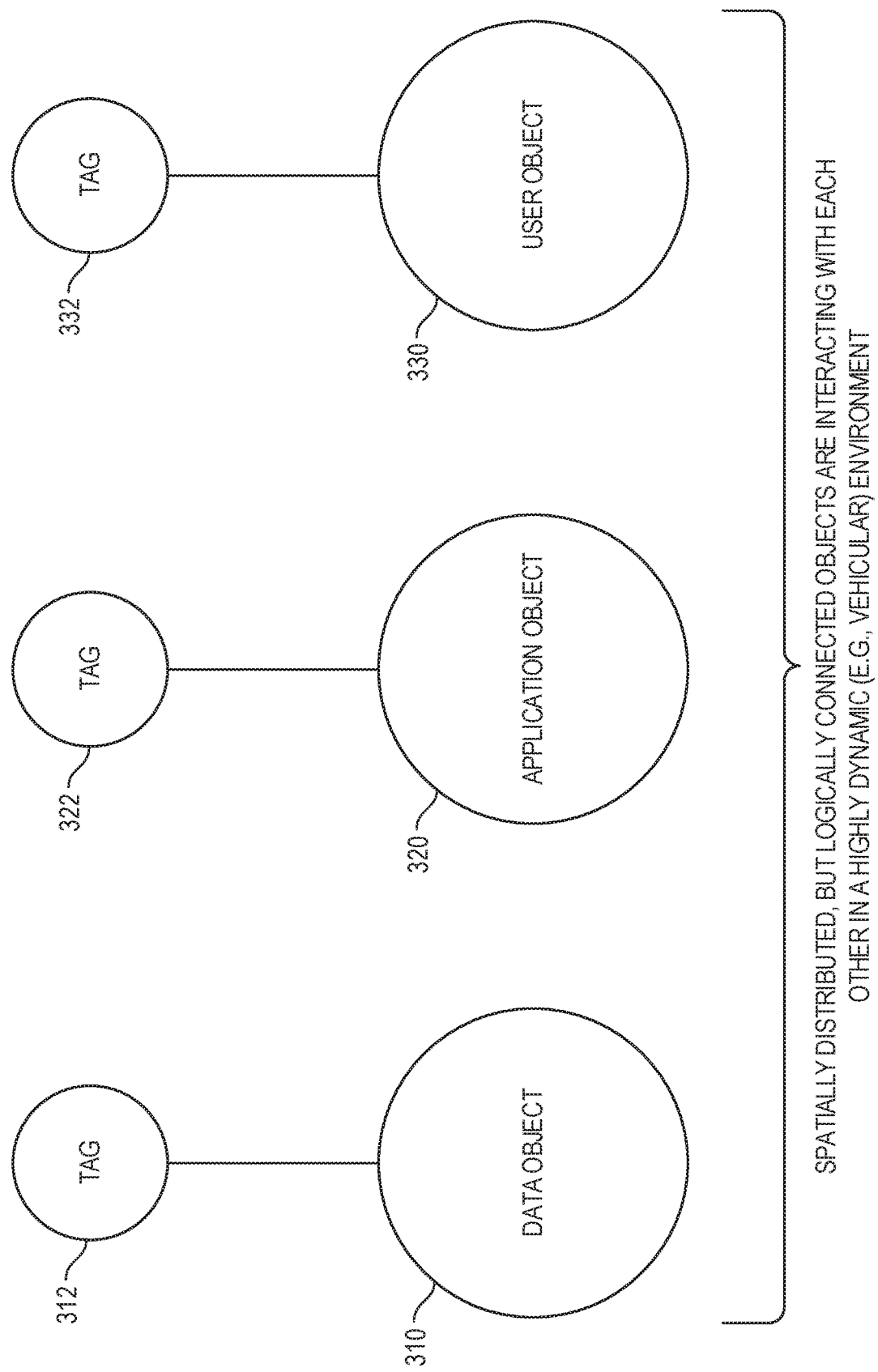
FIG. 3 illustrates different object and tag types for communicating data in a MEC architecture, according to an example.

FIG. 3 illustrates different object and tag types for communicating data in a MEC architecture, according to an example. Represented here are spatially separated DATA, APPLICATION, and USER objects (310, 320, 330) along with corresponding tags (312, 322, 332). In an example, the tags (312, 322, 332) carry properties or characteristics of the corresponding objects. In an example, the tags (312, 322, 332) are an identifier to the properties or characteristics indexed outside of the data itself, such as may be implemented in a MEC orchestrator. In various examples, the tags may be linked, organized as a hierarchy, or otherwise establish relationships among objects, tags, and associated data.

The descriptions below define signaling among the involved system elements to enable optimal network location (e.g., on the vehicle itself, in a Road Side Unit (RSU), in the Access Network, in the Core Network, etc.) to host the spatially separated DATA, APPLICATION, and USER objects (310, 320, 330). Further, tag-based pathfinding may be used to connect the objects into a complete application across devices. Here, pathfinding entails the mechanism by which objects connect to each other while being spatially distributed within a dynamic environment (e.g., vehicles moving at a speed up to 300 kilometers per hour). This mechanism may be iterated on a periodic basis, or triggered by events, for the mobility management of objects in the system.

The spatially distributed, but logically connected objects of FIGS. 2 and 3 provide a more structured use of the 5G cloud infrastructure for automotive, and other, use cases that facilitate interoperability and wider adoption of MEC (and FOG) networks, including in virtualized environments. This is accomplished by separating DATA, APPLICATION, and USER objects (310, 320, 330) that are re-integrated into whole applications via the tags (312, 322, 332). This may be accomplished in a system with the following operations:

1) Definition of the entities involved, definition of the objects, and definition of the object tags;
2) Introduction and definition of signaling (e.g., messages or protocols) among the involved entities;
3) Propagating objects (of executables and data) throughout the network infrastructure and the creation of logical or physical links to connect the DATA, APPLICATION, and USER objects; and
4) Implementing dynamic pathfinding to maintain object connections in a highly dynamic environment.

Figure 4:
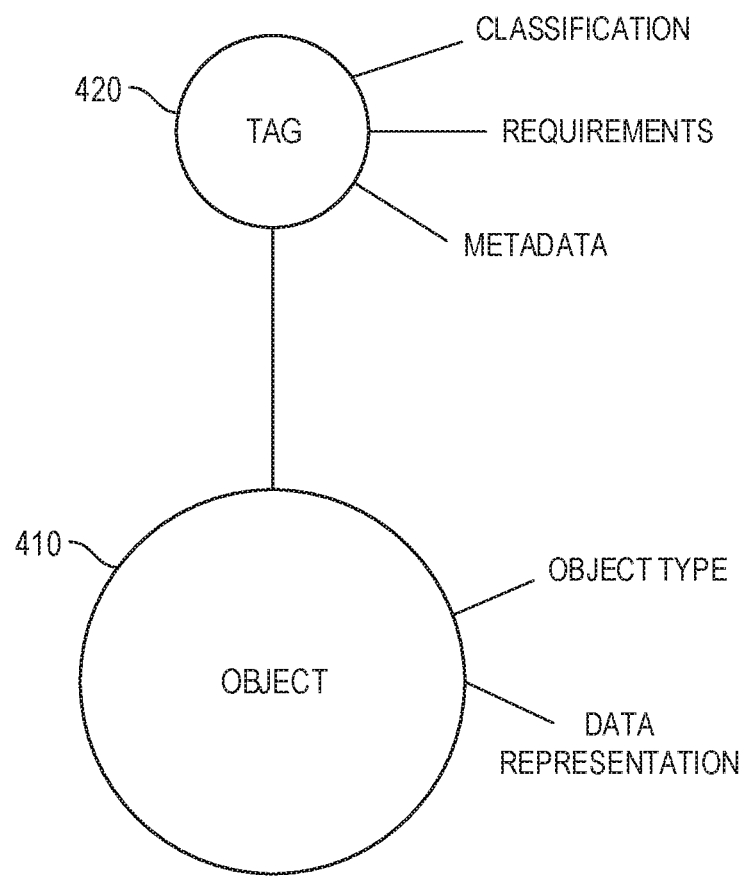
FIG. 4 illustrates an object and tag pairing for communicating data in a MEC architecture, according to an example.

FIG. 4 illustrates a pairing of a generic object 410 to a generic tag 420, according to an example. In an example, the following uses of entities, objects, and object tags, may be defined as follows for the following three types of objects (and associated tags), with reference to the objects and tags of FIG. 3:

A DATA object 310 is typically a data container that is capable of representing a data structure or device, such as a memory element, a sensor output, a dataset containing structured or unstructured data, etc.

An APPLICATION object 320 is typically a function (e.g., executable software, hardware, etc.) that is capable of being represented by a Touring Machine. Thus, an APPLICATION object 320 is an algorithmic description of a process that consumes input data and creates output data. Generally, the outputs of an APPLICATION object 320 are typically provided to one or more USER objects 330.

A USER object 330 is typically an entity that consumes the output data of an APPLICATION object 320. A USER object 330 represents the use (e.g., presentation, control based on, etc.) of data in the DATA object 310 as, in an example, processed (e.g., aggregated, classified, etc.) by the APPLICATION object 320.

The respective tag (312, 322, 332) for each object represents metadata used to identify the object. Thus, the tag may include a classification (e.g., USER, DATA, or APPLICATION classification), a set of requirements (e.g., a type of data, such as from a particular sensor; a time when the data was collected or processed, latency, bandwidth, hardware type, etc.), security information, etc. Generally, locating objects, establishing connections between objects, and maintaining those connections are accomplished via the tags. Other forms of classifications, types, and relationships may also be accomplished via the tags.

Figure 5:
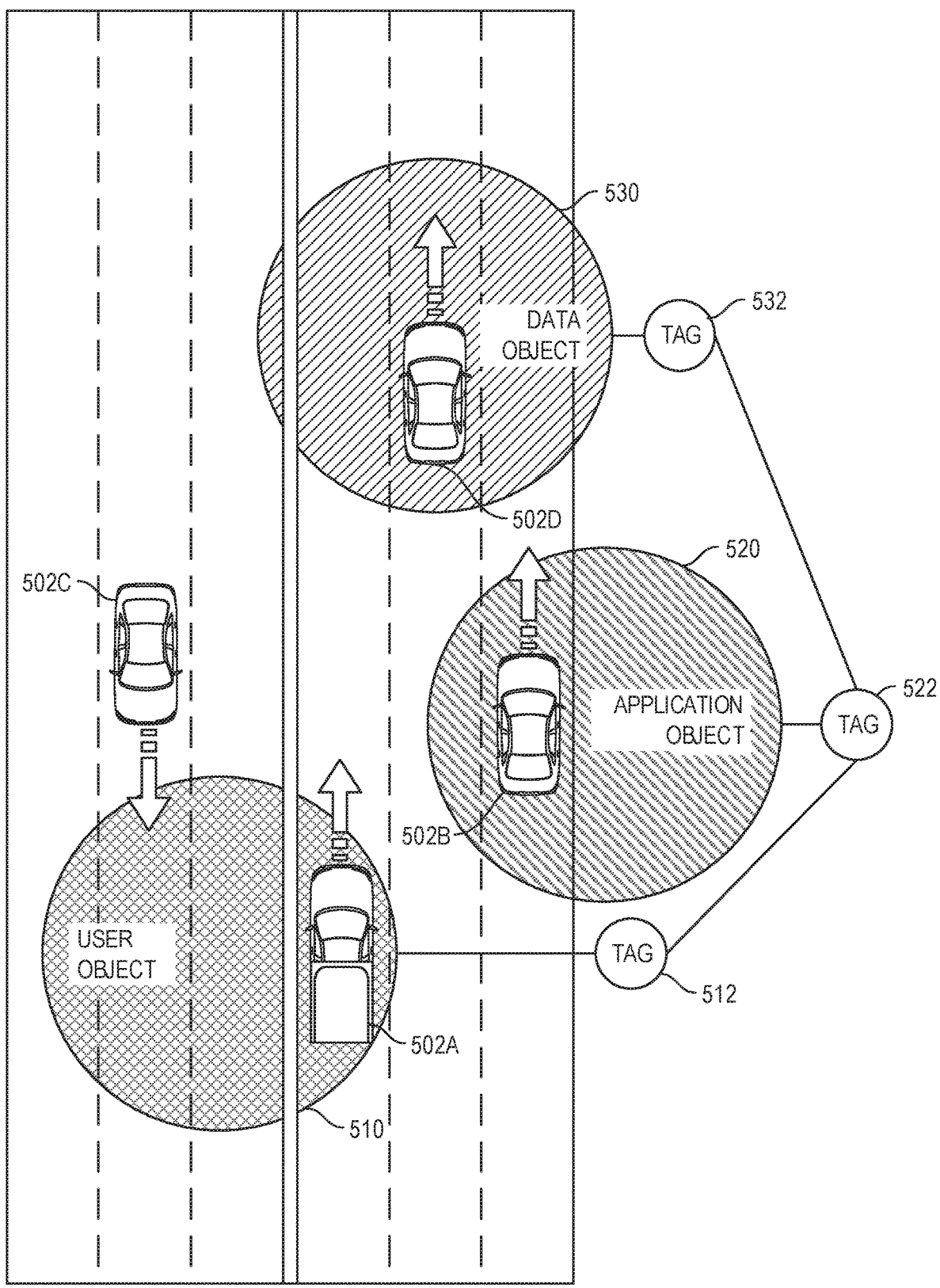
FIG. 5 illustrates a multi-object interaction scenario involving spatially distributed objects, according to an example.

FIG. 5 illustrates a multi-object interaction scenario, according to an example. FIG. 5 specifically depicts a vehicular environment in which cars are distributed in space and movement characteristics, and use the presently described object and tag framework to observe, process, and consume data. The object and tag framework enables the acquisition of data, processing of data, and usage of data among different entities in a dynamically changing environment. This environment is not limited to the use of motor vehicles, as such entities may comprise any number or type of communication entities on a network.

In this example, the objects are spatially distributed (including with the objects being located in or at different vehicles traveling in different directions), as the objects are connected through the respective tags 512, 522, 532 with use of logical links. The logical links are enabled via physical V2V and V2X connections. For example, consider a scenario where the deployed DATA object 530 contains sensor data in proximity to an accident location. Once the vehicle 502D has passed the accident location, the DATA object 530 is moved to another vehicle closer to the accident location.

In another example, the APPLICATION object 520 has a logical link to DATA object 530. Even though the location of the DATA object 530 changes constantly (e.g., the DATA object keeps moving to a vehicle closest to an accident location, such as from vehicle 502D, to 502B, to 502A), the locale of the DATA object 530 may be quite static, such as when hosted at a vehicle providing a MEC node that is close to the accident.

In another example, the APPLICATION object 520 processes inputs and generates outputs, such as traffic warning messages in the case of the accident DATA object 530. This processed data may be transferred to surrounding USER objects 510, such as in-dash warning systems to alert drivers of potential danger.

In another example, involving object recognition in the urban area, camera sensors may be installed in RSUs or other processing nodes. An APPLICATION object 520 analyzes the video (e.g., contained in the DATA object 530) and produces output data relevant to a particular device or entity (e.g., "Your lost dog has been located in the city"). In this example, the APPLICATION object 520 may produce a data flow that is stored in the DATA object 530, and the USER object 510 is connected to the DATA object 530 directly, or to the APPLICATION object 520.

In another example, involving collision avoidance, different sensors (e.g., video cameras, radar, etc.) are installed in the respective vehicle (e.g., vehicles 502A. 502B, 502C, 502D that may be equipped with a UE) and provide information to throughout the vehicles and system, such as by signaling the presence of an object or another vehicle that may be dangerous for the other vehicle(s) in the traffic jam. In this example, the USER object 510 produces a data flow that is stored in the DATA object 530. In an example, the USER object 510 is connected with both the DATA object 530 and the APPLICATION object 520. These examples are not limiting, as the data separation and use of tags to re-assemble the data may be used in a variety of use cases.

Figure 6:
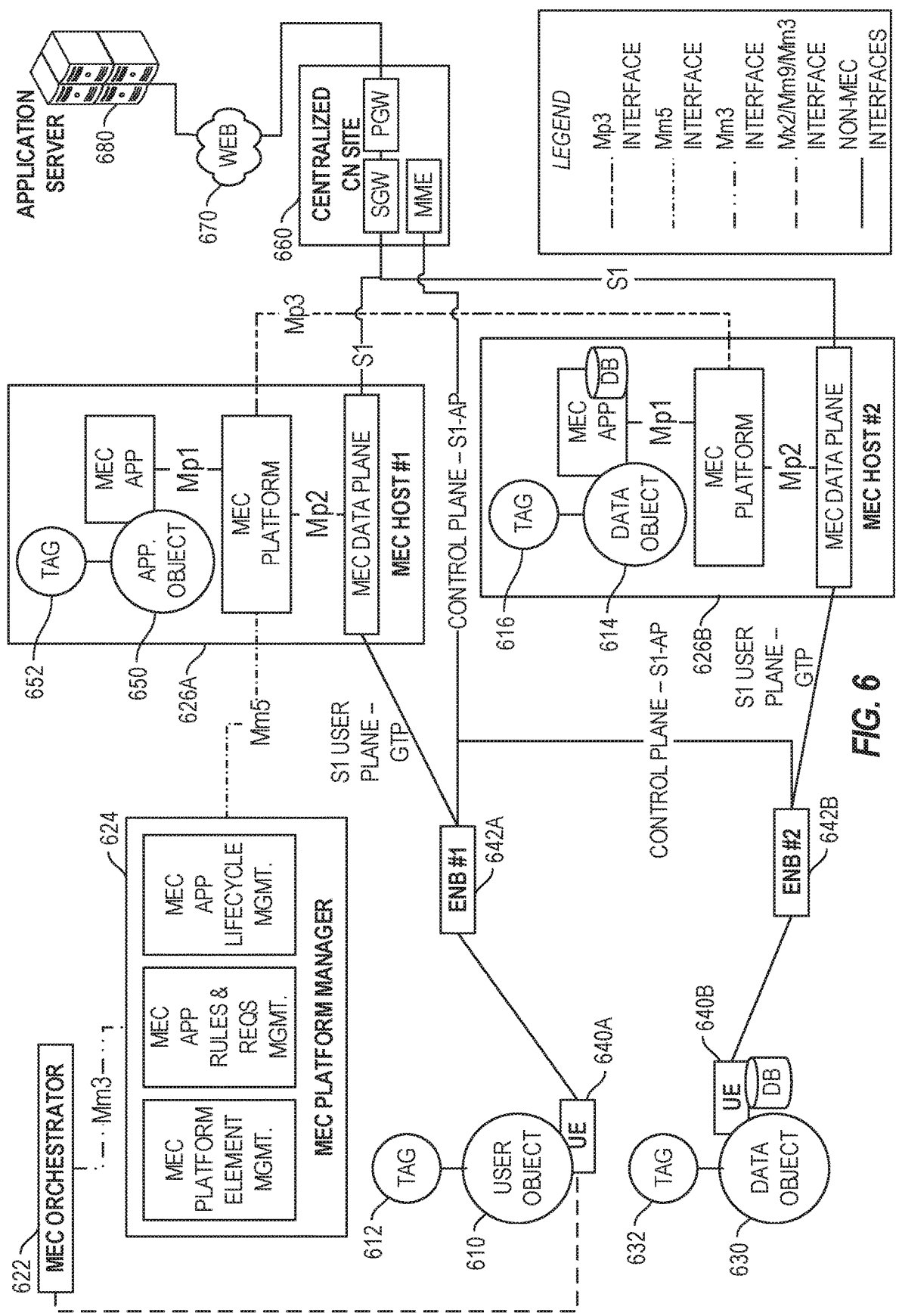
FIG. 6 illustrates component communications for an MEC architecture, according to an example.

FIG. 6 illustrates component communications for an MEC architecture, according to an example. The illustrated system is an implementation that operates within the ETSI MEC ISG framework. The connections represented by some form of dashed line (as noted in the legend in FIG. 6) may be defined according to a specification from an ETSI MEC standards family.

The solid line connections represent non-MEC connections, such as utilizing third generation partnership project (3GPP) cellular network connections S1, S1-AP, etc. Other connection techniques (e.g., protocols) and connections may also be used. Accordingly, in the scenario of FIG. 6, the system entities (e.g., MEC orchestrator 622, MEC platform manager 624, MEC hosts 626A, 626B) are connected by MEC (or NFV) logical links (indicated with dashed lines), in addition to network infrastructure links (e.g., a 5G Long Term Evolution (LTE) network, such as provided among UEs 640A, 640B, eNBs 642A. 642B, a CN site 660, etc.) (indicated with solid lines). Further connection to cloud services (e.g., an application server 680 access via the web 670) may also be connected via backhaul network infrastructure links.

At the endpoints, the respective tags (e.g., tags 612, 616, 632, 652) include metadata for objects (e.g., objects 610, 614, 630, 650) to enable entities (which may be represented as simply another object) to identify counterparts and connect to those counterparts. Again, tags may define characteristics of the object, including what it provides and how to connection to it. DATA object tags (e.g., DATA object tag 632, linked to DATA object 630) may provide information on the type of data created, the detection periodicity, provisioning latency, etc. An APPLICATION object tag (e.g., APPLICATION object tag 652 linked to APPLICATION object 650) may contain information on the type of input data which is requested (e.g., thermometer data for a given building) and the type of output data that is created (e.g., an aggregated temperature for the building), operational latency characteristics, processing requirements (e.g., to define what hardware is capable of hosting the APPLICATION object), etc. USER object tags may contain information of data that may be delivered by APPLICATION objects (or directly by DATA objects), for use, such as display (e.g., displaying the temperature of the building), control (e.g., modifying a heating or cooling system to change the temperature of the building in response to the received temperature), etc.

Tags for APPLICATION Objects.

In an example, the APPLICATION object is tagged with one or more of a set of key performance indicators (KPIs), which are metrics or operational parameters, described in the first column of the table below. These KPIs facilitate automated location, and relocation, of APPLICATION objects. For example, TABLE 1 below depicts an example chart data structure to match requirements to respective capabilities of nodes.

TABLE 1

| APP requirements | | MEC/FOG nodes capabilities | | | | |
|---|---|---|---|---|---|---|
| (tag of an APPLICATION object) | | Node #1 | Node #2 | Node #3 | Node #4 | Node #5 |
| Type | Requirement | | | | | |
| Required for execution of Application | Target E2E latency Average CPU resources Peak CPU resources Average memory resources Peak memory resources Available MEC APIs BH link connectivity | | | | | |
| Required DATA object "tags" to match with APPLICATION | Data type Data time relevance class Data geographic location relevance class Data network component relevance class | | | | | |

The parameters are used to match MEC or FOG nodes to APPLICATION object requirements. Thus, when relocating an APPLICATION object from a first node, another node is selected from available nodes based on the other node's ability to satisfy the parameters. Some parameters may be required while others may indicate a preference. A preference parameter will not prevent the APPLICATION object from relocating to a node that does not meet the preference parameter, but between two potential destination nodes, one that matches the preference parameter and one that does not, the matching node is selected. Thus, the outcome of this comparison is the basis for decisions on MEC or FOG node migration. In an example, the comparison may also consider latency parameters the handover itself.

The first seven rows ("Required for execution of Application") relate to APPLICATION object execution requirements. For example, such requirement may specify whether there is: sufficient processing power, memory, access to suitable libraries (e.g., application programming interfaces (APIs)), etc. The last three rows relate to required DATA object characteristics to match the APPLICATION object and DATA objects to provide input. For example, these requirements may include the type of data, the validity over time, geographic area, etc. If there is a match between a DATA object and the APPLICATION object, they are connected, and the APPLICATION object produces output based on the DATA object as input.

As noted above, APPLICATION object migration (e.g., handover) time is also a factor. The table below, TABLE 2, illustrates Migration Time matrix, specifying a migration penalty (e.g., added latency) associated with migrating the APPLICATION object that is considered in a decision as to whether to initiate a migration.

TABLE 2

| Migration Time [ms] | Node #1 | Node #2 | Node #3 | Node #4 | Node #5 |
|---|---|---|---|---|---|
| Node #1 |  | $T_{1,2}$ | $T_{1,3}$ | $T_{1,4}$ | $T_{1,5}$ |
| Node #2 | $T_{2,1}$ |  | $T_{2,4}$ | $T_{2,4}$ | $T_{2,5}$ |
| Node #3 | $T_{3,1}$ | $T_{3,2}$ |  | $T_{3,4}$ | $T_{3,5}$ |
| Node #4 | $T_{4,1}$ | $T_{4,2}$ | $T_{4,3}$ |  | $T_{4,5}$ |
| Node #5 | $T_{5,1}$ | $T_{5,2}$ | $T_{5,2}$ | $T_{5,4}$ |  |

In other examples, a dedicated matrix may be built for different kind of objects, e.g. Data-Application-, and User-Objects. Any such matrix is not necessarily symmetric because links may have different uplink (UL) or downlink (DL) characteristics.

Tags for DATA Objects.

DATA objects represent data, either raw data produced from a sensor, a data set, output data from an APPLICATION object, etc. DATA object tags may provide information on the type of data, the detection periodicity, the provisioning latency, etc.

The following class definitions provide data characterization parameters to be used by APPLICATION objects or USER objects to identify and consume data. These parameters may include: time relevance (e.g., how much latency is tolerated?), geographic location requirements (e.g., how spatially close must the observation be?), network component relevance—such as, which parts of the network (e.g. the Core Network (CN), Access Network, MEC nodes, FOG infrastructure or dedicated single nodes) may provide given data or perform given operations—among others. A non-exhaustive listing of the classes follows in TABLE 3. In an example, DATA object tags include one or more of the following four parameters indicating these classes: (1) Data Type; (2) Data time relevance class; (3) Data geographic location relevance class; (4) Data network component relevance class.

TABLE 3

| | | |
|---|---|---|
| Data types | DT0 (additional letter(s): L = left side, R = right side, F = Front, B = Back) | Radar data, observation of the environment |
| | DT1 (additional letter(s): L = left side, R = right side, F = Front, B = Back) | Camera data, observation of the environment |
| | DT2 (additional letter(s): L = left side, R = right side, F = Front, B = Back) | Sonar data, observation of the environment |
| | DT3 (additional letter(s): L = left side, R = right side, F = Front, B = Back) | GPS data, observation of the environment |
| | DT4 (additional letter(s): L = left side, R = right side, F = Front, B = Back) | LiDAR data, observation of the environment |
| | DT5 . . . DT15 (additional letter(s): L = left side, R = right side, F = Front, B = Back) | Vendor specific sensing/observation data |
| Data network component relevance class | NR0 - Network Relevance level "0" | Indicates that the data is only applicable very locally, e.g. within a single vehicle. |
| | NR1 - Network Relevance level "1" | Indicates that the data is only applicable in close proximity of a car, e.g. it may be shared with a local MEC node. |
| | NR2 - Network Relevance level "2" | Indicates that the data is only applicable in some proximity of a car, e.g. it may be shared with a local MEC node and across MEC nodes. |
| | NR3 - Network Relevance level "3" | Indicates that the data is applicable in some proximity of a car, e.g it may be shared with fixed infrastructure. |
| | NR4 - Network Relevance level "4" | Indicates that the data is applicable in larger neighborhood of a car, e.g. it may be shared with fixed infrastructure and Core network. |

TABLE 3-continued

| | | |
|---|---|---|
| Data time relevance class | TR0 - Time Relevance level "0" | Indicates that the data needs to be processed immediately, its validity may expire within milliseconds. |
| | TR1 - Time Relevance level "1" | Indicates that the data validity may expire within secs. This is sufficient to be shared with surrounding where the data may be used as a sensor extension. |
| | TR2 - Time Relevance level "2" | Indicates that the data validity is in order to of minutes or even hours, e.g. accident related information or similar, to enable long-term buffering and future transfer to passing vehicles. |
| | TR3 - Time Relevance level "3" | Indicates that the data validity will only expire upon an external trigger, e.g. the presence of a construction sitewill always be announced until the obstacle is removed and the corresponding information is declared invalid. Such information may be stored in the core network and any other storage element across the hierarchy wherever necessary. |
| Data geographic location relevance class | GR0 - Geographic Relevance level "0" | Indicates that the data is only applicable very locally, e.g. within meters around the concerned vehicle. |
| | GR1 - Geographic Relevance level "1" | Indicates that the data is only applicable locally and within the proximity, e.g. within 100s of meters around the concerned vehicle. |
| | GR2 - Geographic Relevance level "2" | Indicates that the data is applicable in a larger area, e.g. within a city. |
| | GR3 - Geographic Relevance level "3" | Indicates that the data is applicable everywhere, e.g. a policy change or similar. |

The tags, and the object metadata contained (or referred) within the tags, may be used as follows: 1) an APPLICATION object discovers discover a DATA object; 2) the APPLICATION object obtains (e.g., requests, receives, reads, etc.) the tag for the DATA object: 3) the APPLICATION object determines whether all processing requirements are met with respect to DATA object by investigating the DATA object tag; and 4) DATA objects with tags that match the APPLICATION object requirements are accepted. In an example, the determinations of the processing requirements and investigating of the DATA object tag may include evaluating:

Is the Application Type appropriate (e.g., provide Radar Data)? The DATA object is typically accepted if the exact requested type is available or if more information than required is provided.

Is the time relevance right? Typically the DATA object is accepted if the exact requested time relevance is available or if the object is more broadly applicable than required (e.g., information is valid over a larger time span than required).

Is the geographic relevance right? Typically the DATA object is accepted if the exact requested time relevance is available or if the object is more broadly applicable than required (e.g., information is valid over a larger geographic area than required).

Is the network component relevance right? Typically, the DATA object is accepted if the exact requested time relevance is available or if the object is more broadly applicable than required (e.g., information is valid over a larger number of network elements than required).

As noted, DATA objects with tags that match the APPLICATION object requirements are accepted. The APPLICATION object then connects to those DATA objects. In an example, APPLICATION objects may connect to multiple DATA objects that provide the same (or fungible) data for information redundancy to derive more reliable estimates.

Tags for USER Objects.

USER object tags may contain information of requested deliverable by APPLICATION objects or DATA objects. The USER object tags may also indicate that the USER object produces output (e.g., data flow) that is consumed by APPLICATION objects, or storable DATA objects. In an example, USER object tags may include information on specific APPLICATION objects or the DATA object affinity (e.g., compatibility of data, connectability—such as whether they are connected and communication requirements in terms of latency, bandwidth, etc.), among other things. Depending on connections among the USER. DATA, and APPLICATION objects, the USER object or the USER object tag may provide information to establish logical or physical links between the objects to address mobility issues from the perspective of the consumer (e.g., avoiding unnecessary network burdens while there is no audience for the data or processing of the data).

Figure 7:
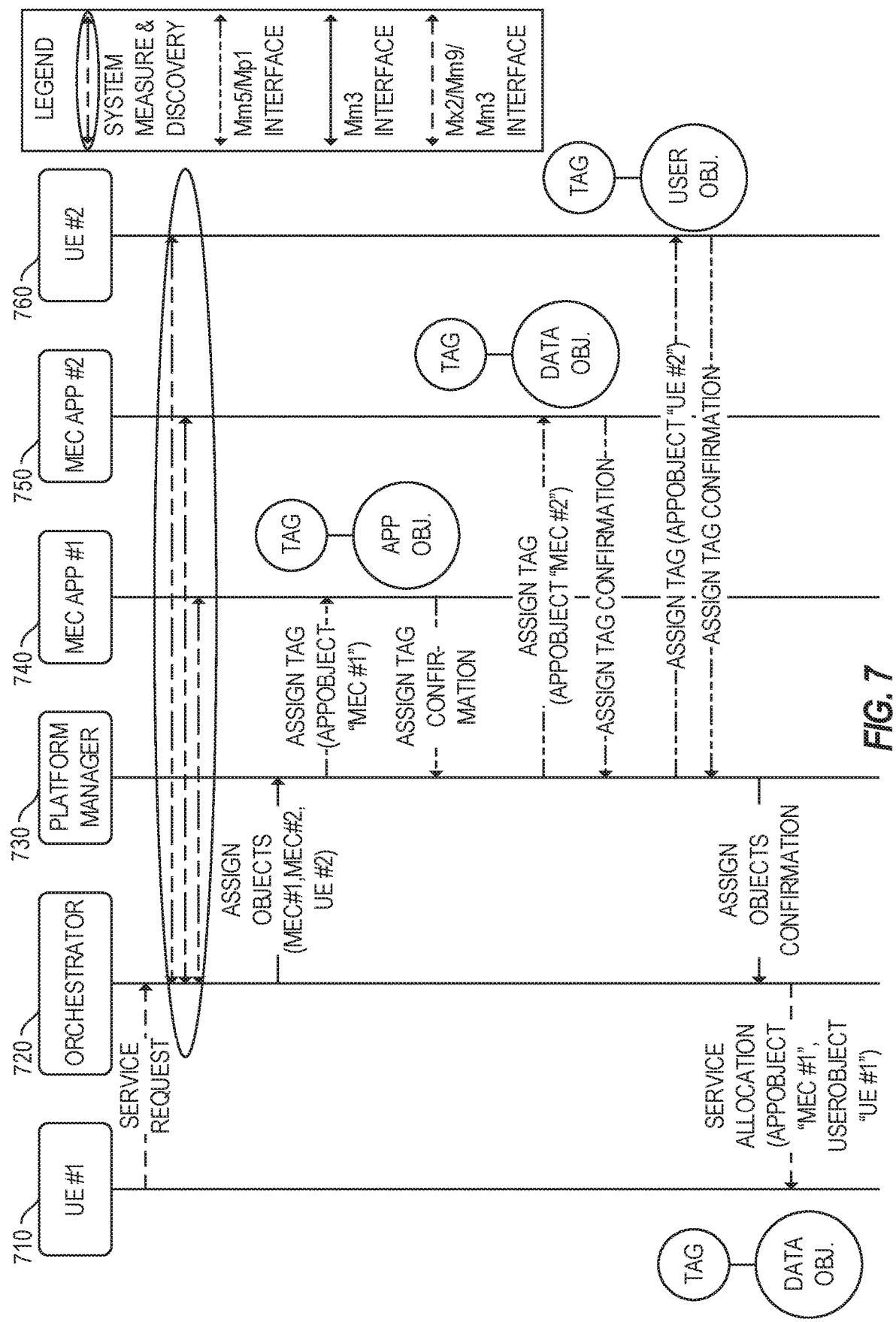
FIG. 7 illustrates a message sequence chart for an MEC architecture, according to an example.

FIG. 7 illustrates a message sequence chart for an MEC architecture, depicting signaling among the involved entities, according to an example. The first UE 710 (e.g., via an application running on the UE) provides an initial trigger that requests a service (e.g. an edge V2X application that consumes data from sensors or other terminals). Thus, the UE 710 establishes the parameters of an application comprising data, processing, and consumption.

A discovery and measurement phase is then performed (e.g., by a MEC orchestrator 720) that may be indirectly triggered by the UE 710 or performed periodically or upon another trigger (e.g., a network request) to establish the network topology. This discovery and measurement may be performed frequently due to the ever-changing topologies of dynamic networks.

After entities are discovered (e.g., potential application participants), object tags are assigned to the entities. This is shown in FIG. 7 through the assigning of a first tag with an application object by a first MEC app 740, the assigning of a second tag with a data object by a second MEC app 750, and the assigning of third tag with a user object by a second UE 760, in response to operations coordinated by a platform manager 730. The tags are then transmitted back to the UE 710. The UE 710 may then connect to, or request the network to connect, the different objects selected to participate in the application.

In other examples, the separation between the platform manager 730 and the orchestrator 720 is not required, as the same entity may manage or coordinate resources used in connection with the presently described objects and tags. For instance, the UE may not be aware of specific access points or entities, but simply connect to a MEC entity that has knowledge of the system, and requests use of a service, with backend processing coordinated among one or more MEC entities.

Although the sequence chart of FIG. 7 illustrates a process being initiated by a user who wants to consume a result (the UE #1 710, a consumer), it will be understood that similar process may be initiated by other objects and entities (e.g., such as for an entity to offer information on emergency braking ahead, a nearby hazard, etc.). As a result, any number of interested devices may link to appropriate objects and use the present architecture to obtain service and application information.

Figure 8:
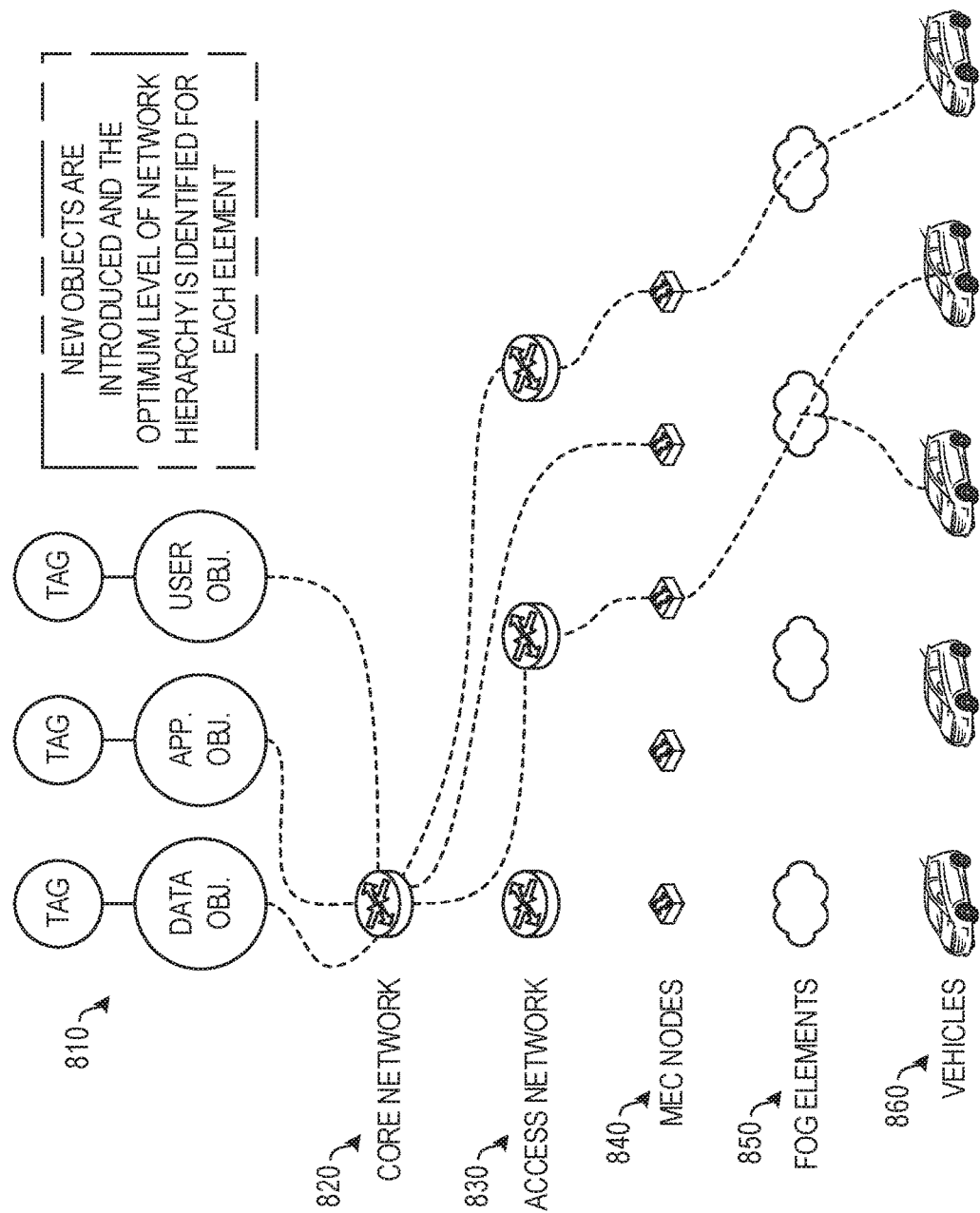
FIG. 8 illustrates a cloud-hosted tag network topology, according to an example.
Figure 9:
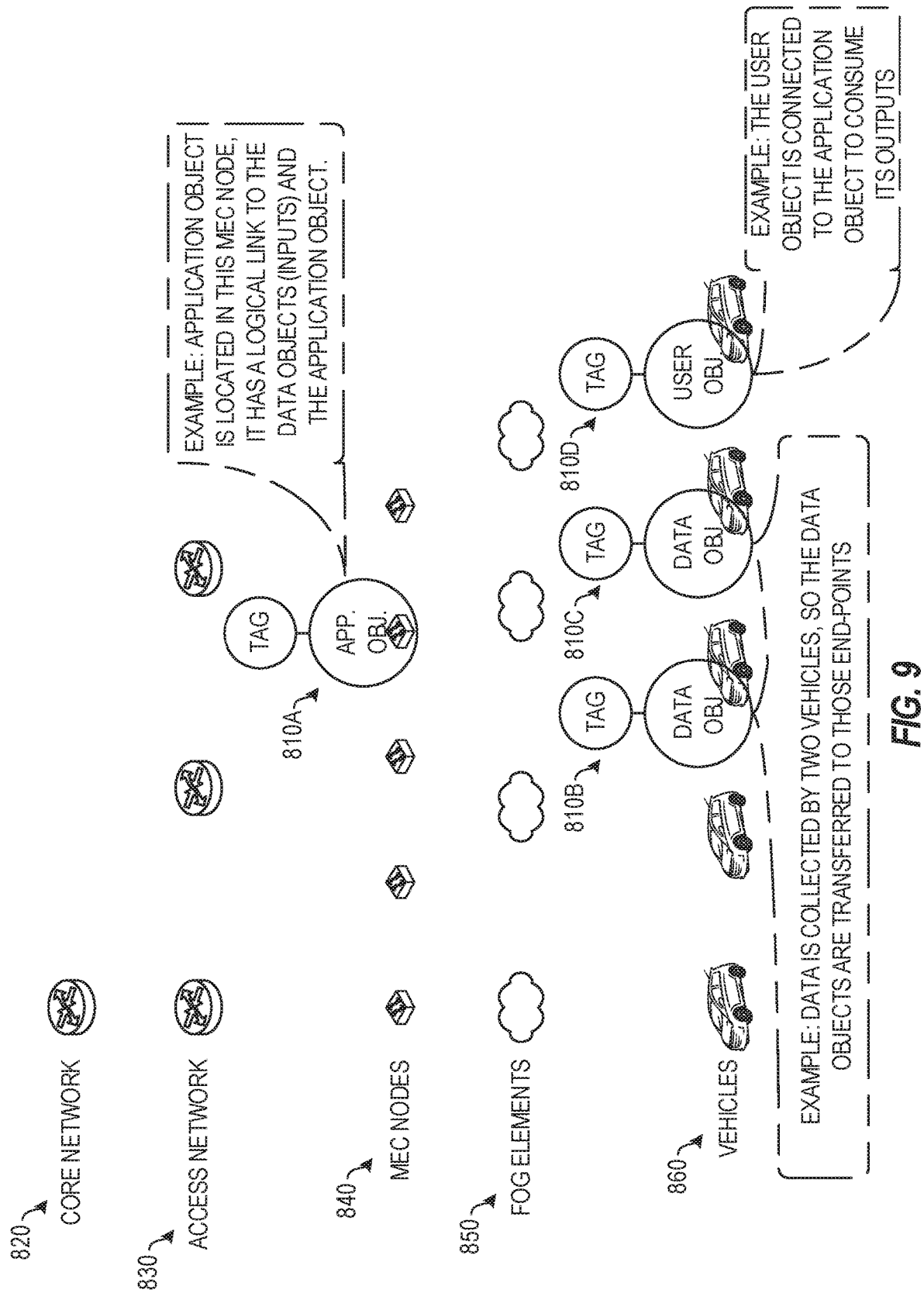
FIG. 9 illustrates a distributed tag network topology, according to an example.

Propagating or linking data and executables in objects throughout the network may be effectively accomplished as new DATA, APPLICATION, or USER objects are introduced and distributed throughout the network. FIGS. 8 and 9 respectively illustrate a cloud hosted tag network topology, and a distributed tag network topology, for propagation of the objects. Although both topologies are suitable, the distributed topology of FIG. 9 involving deployed objects and tags may provide advantages relating to a responsive experience and reduction of network congestion.

As shown in FIG. 8, a series of DATA, APPLICATION, or USER objects 810 may be linked from the core network 820, and distributed among other entities and layers of the network. These include entities and layers of the access network 830, MEC nodes 840. FOG elements 850, and vehicles 860. Specifically, the objects 810 are introduced and deployed for respective elements among the network elements to enable mobility use cases, based on identifying an optimum level of a network hierarchy for deploying each element.

As shown in FIG. 9, the series of DATA, APPLICATION, or USER objects (e.g., objects 810A, 810B, 810C. 810D) may be deployed at different levels of the network (at the same levels of the network 820, 830, 840, 850, 860 depicted in FIG. 8). As an example, this may include the use of data that is collected by two endpoints of the vehicles 860, with data objects being transferred to those end-points. As another example, an APPLICATION object may be located at a node of the MEC nodes 840; in this scenario, the subject MEC node has a logical link to the data objects (inputs) and the application object. As still another example, the USER object may be connected to the APPLICATION object, to consume its outputs. Other combinations and linking between the objects may also be enabled.

In an example, the optimum location for DATA. APPLICATION, or USER objects may be identified using one or more of the following key performance indicators (KPIs):
1) Spatial proximity to target event (e.g., accident, etc.);
2) Physical proximity to other objects (e.g., how much time is required to transfer data from a DATA object to APPLICATION object);
3) Available processing power; or
4) Current load of the target (network) node and corresponding processing latency.

After logical connections are formed (e.g., DATA object '1' is input for APPLICATION object 'X'), physical connections are established to actually move the data between the objects. In an example, the physical links are implemented with V2V-links, V2I, or I2V links between vehicles and infrastructure, etc. This permits a stable set of logical connections while also enabling a highly dynamic physical environment as, for example, DATA objects constantly move the vehicle closest to an accident location, the APPLICATION object moves to a close vehicle—in the case where the vehicle offers MEC services—or is otherwise moved to a near-by RSU, etc.

Figure 10:
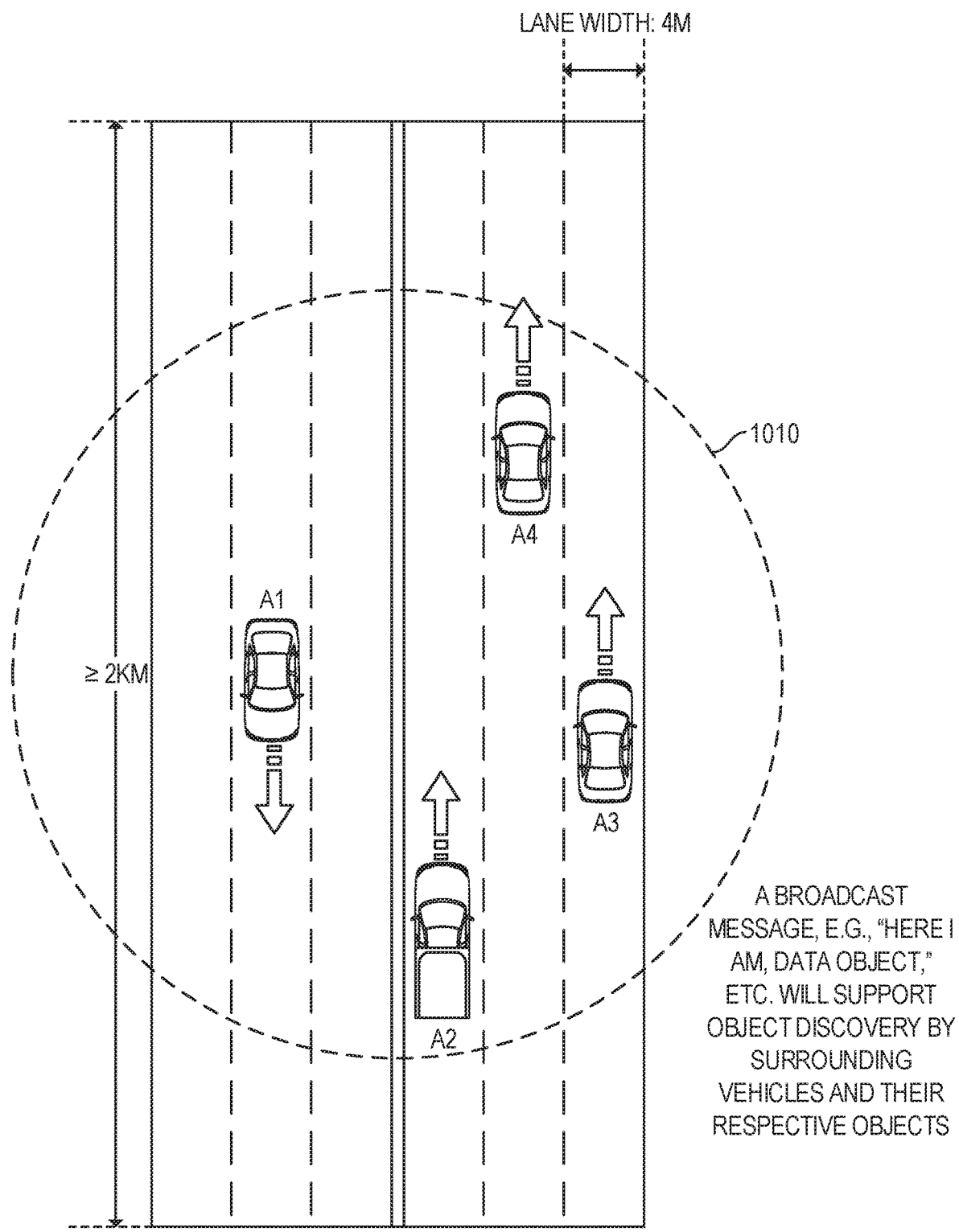
FIG. 10 illustrates object discovery in a mobile setting, according to an example.

In further examples, dynamic pathfinding may be used to maintain object connectivity in a dynamic environment. FIG. 10 illustrates object discovery in a mobile setting, according to an example. In the scenario of FIG. 10, the distribution of Object-related (tag related) information is used to support identification of logical links themselves, among entities (A1, A2, A3, A4) within a communication area 1010.

The use of tags to carry necessary compatibility information effectively enables dynamic application construction from a variety of entities. In mobile (and highly dynamic) hardware environments, such as in a highway vehicle context, the tags may be shared via radio broadcasts. Thus, objects may distribute a "HERE I AM" message to the surrounding area. This surrounding area may correspond to a subset of the operational area or the entire operational area. Additionally, in further examples, entering, leaving, traversing, or being in a particular operational area (such as an area surrounding a particular network entity or hosted object) or area boundary may cause certain actions and activities with the network service.

Figure 11:
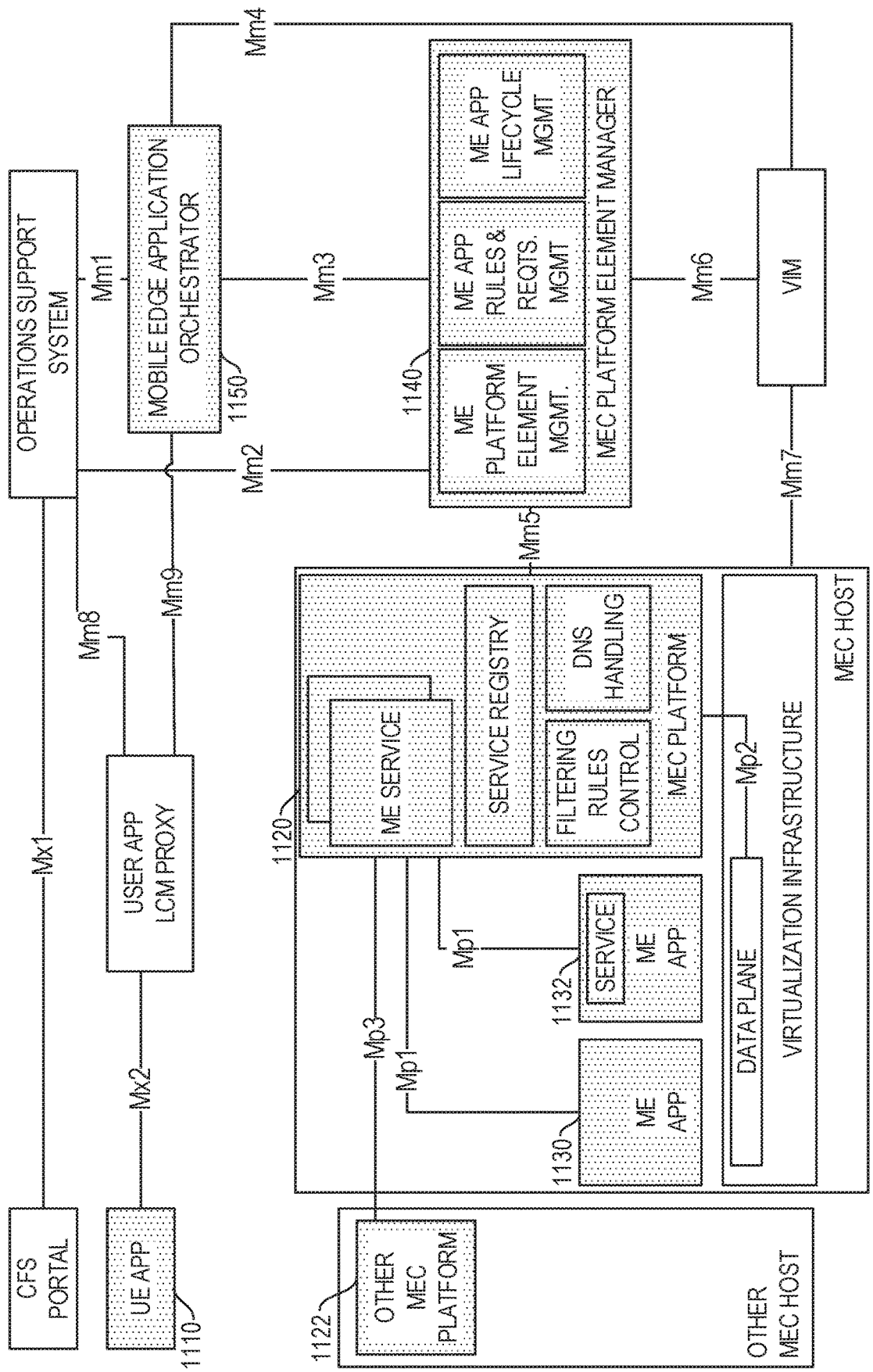
FIG. 11 illustrates a MEC network architecture modified for supporting objects and tags, according to an example.

As referenced in FIG. 6 above, the deployment of objects and tags may occur in a MEC-based network architecture. FIG. 11 illustrates a specific configuration of a MEC network architecture, according to an example, in which various components of the architecture are modified for supporting objects and tags. FIG. 11 specifically illustrates a MEC system (in accordance with the ETSI ISG MEC-003 specification), with shaded blocks used to indicate processing aspects for the MEC architecture configuration described above. Specifically, enhancements to the UE app 1110, MEC platforms 1120, 1122. ME applications 1130, 1132, MEC platform element manager 1140, or mobile edge application orchestrator 1150, may be used to support data object and tag processing capabilities. This may include the definition of functions, interfaces, data values, and operational requirements to support data objects and tags among any of these MEC processing entities.

Figure 12:
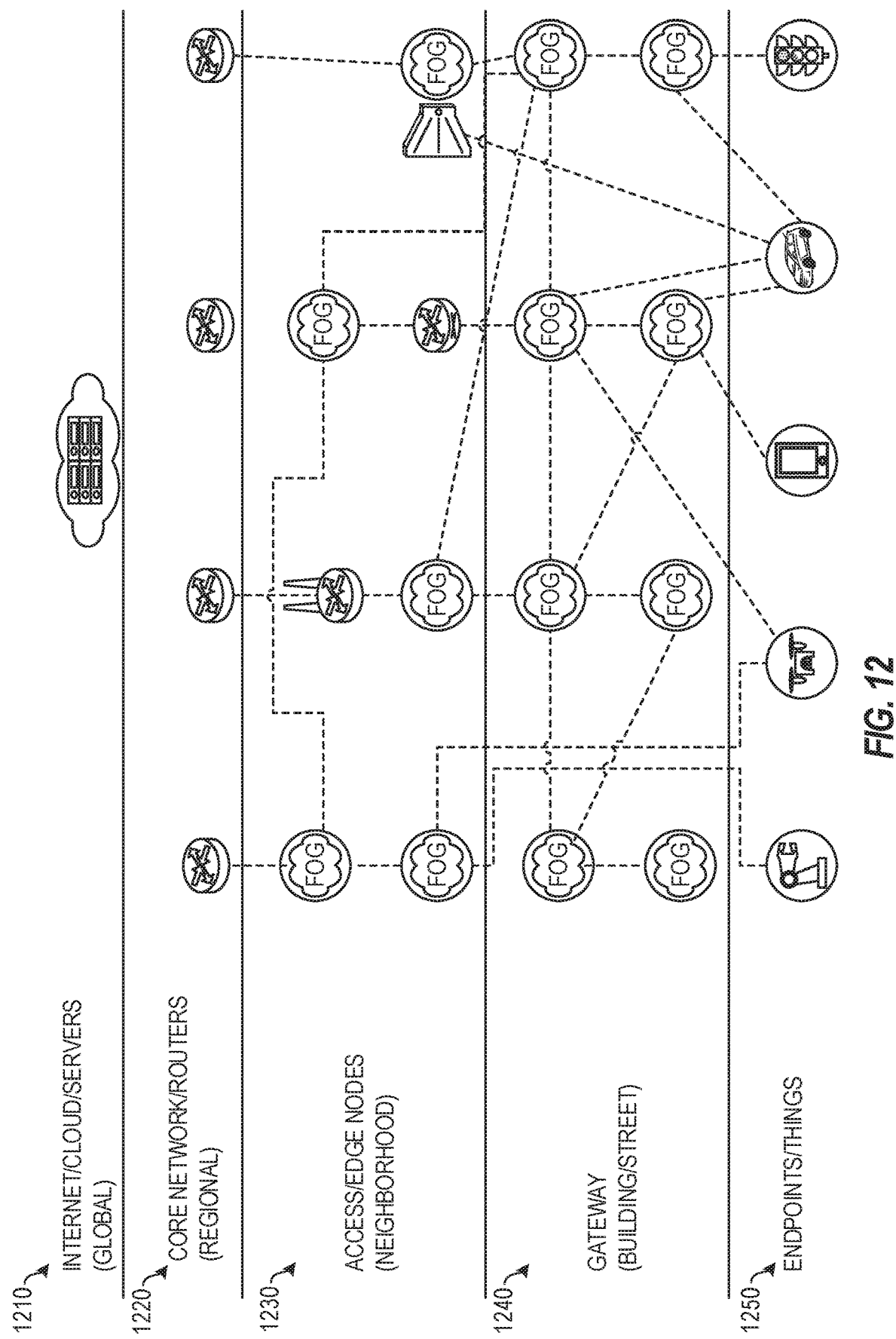
FIG. 12 illustrates a MEC and FOG network topology, according to an example.

FIG. 12 illustrates a MEC and FOG network topology, according to an example. This network topology, which includes a number of conventional networking layers, may be extended through use of the tags and objects discussed herein. Specifically, the relationships between endpoints (at endpoints/things network layer 1250), gateways (at gateway layer 1240), access or edge computing nodes (e.g., at neighborhood nodes layer 1230), core network or routers (e.g., at regional or central office layer 1220), may be represented through the use of linked objects and tag properties.

A FOG network (e.g., established at gateway layer 1240) may represent a dense geographical distribution of near-user edge devices (e.g., FOG nodes), equipped with storage capabilities (e.g., to avoid the need to store data in cloud data centers), communication capabilities (e.g., rather than routed over the internet backbone), control capabilities, configuration capabilities, measurement and management capabilities (rather than controlled primarily by network gateways such as those in the LTE core network), among others. In this context, FIG. 12 illustrates a general architecture that integrates a number of MEC and FOG nodes-categorized in different layers (based on their position, connectivity and processing capabilities, etc.). It will be understood, however, that such FOG nodes may be replaced or augmented by edge computing processing nodes.

FOG nodes may be categorized depending on the topology and the layer where they are located. In contrast, from a MEC standard perspective, each FOG node may be considered as a mobile edge (ME) Host, or a simple entity hosting a ME app and a light-weighted ME Platform.

In an example, a MEC or FOG node may be defined as an application instance, connected to or running on a device (ME Host) that is hosting a ME Platform. Here, the application consumes MEC services and is associated to a ME Host in the system. The nodes may be migrated, associated to different ME Hosts, or consume MEC services from other (e.g., local or remote) ME platforms.

In contrast to this approach, traditional V2V applications are reliant on remote cloud data storage and processing to exchange and coordinate information. A cloud data arrangement allows for long-term data collection and storage, but is not optimal for highly time varying data, such as a collision, traffic light change, etc. and may fail in attempting to meet latency challenges, such as stopping a vehicle when a child runs into the street.

The tagged data objects and object spatial separation described herein complements existing cloud-based information processing by adding local and ultra-low-latency storage and processing of data. Thus, the MEC or FOG facilities are used to locally create, maintain, and destroy MEC or FOG nodes to host DATA. APPLICATION, or even USER objects, based upon need (as determined by tag searches, tag requests, etc.)

Depending on the real-time requirements in a vehicular communications context, a hierarchical structure of data processing and storage nodes are defined. For example, including local ultra-low-latency processing, regional storage and processing as well as remote cloud data-center based storage and processing. KPIs may be used to identify where sensor data is best transferred and where it is processed or stored. This typically depends on the ISO layer dependency of the data. For example, lower layer (PHY, MAC, routing, etc.) data typically changes quickly and is better handled locally in order to meet latency requirements. Higher layer data such as Application Layer data is typically less time critical and may be stored and processed in a remote cloud data-center.

Figure 13:
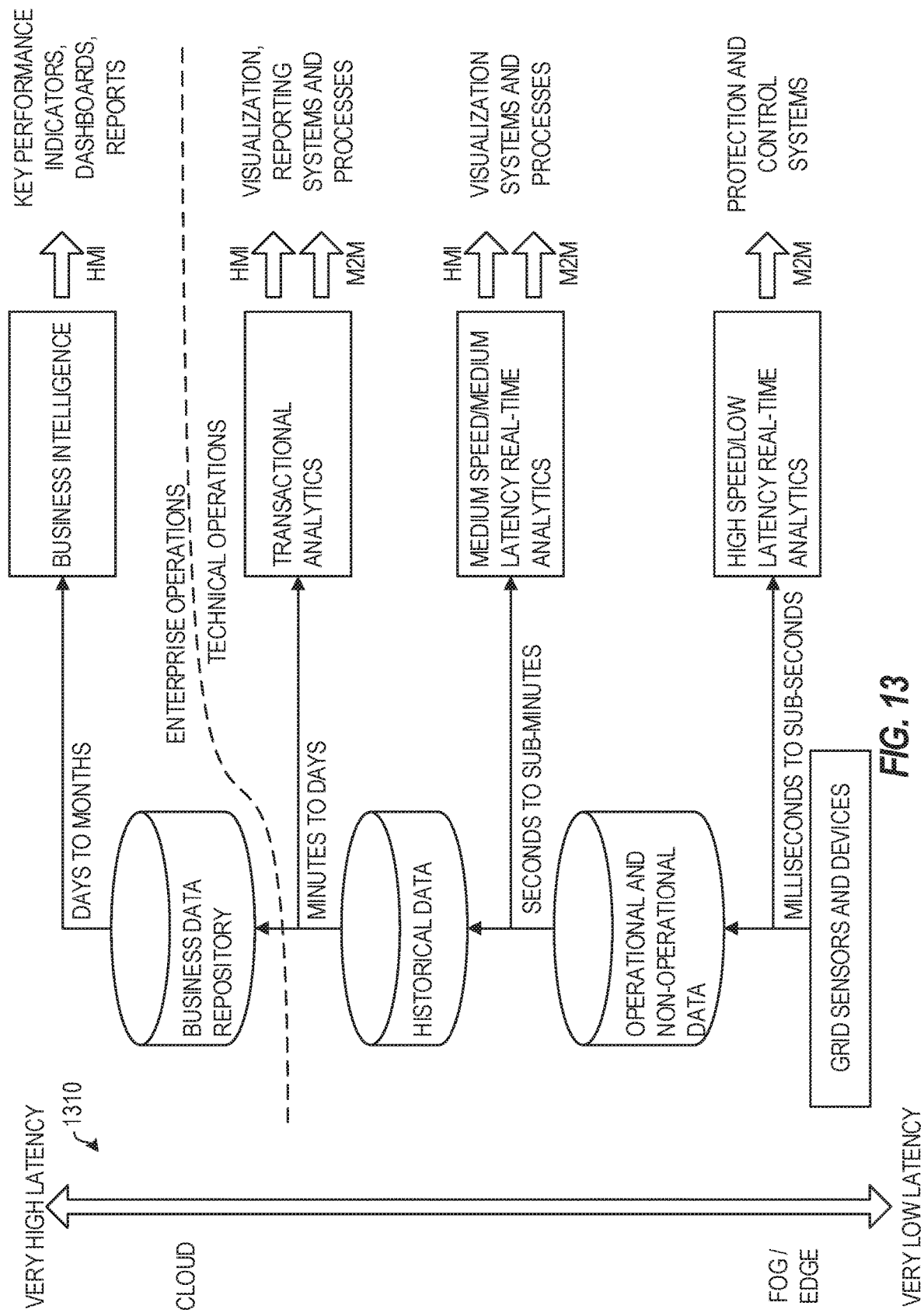
FIG. 13 illustrates processing and storage layers in a MEC and FOG network, according to an example.

FIG. 13 illustrates processing and storage layers in a MEC and FOG network, according to an example. The illustrated data storage or processing hierarchy 1310 relative to the cloud and fog/edge networks allows dynamic reconfiguration of elements to meet latency and data processing parameters.

The lowest hierarchy level is on a vehicle-level. This level stores data on past observations or data obtained from other vehicles. The second hierarchy level is distributed storage across a number of vehicles. This distributed storage may change on short notice depending on vehicle proximity to each other or a target location (e.g., near an accident). The third hierarchy level is in a local anchor point, such as a MEC component, carried by a vehicle in order to coordinate vehicles in a pool of cars. The fourth level of hierarchy is storage shared across MEC components. For example, data is shared between distinct pools of vehicles that are in range of each other.

The fifth level of hierarchy is fixed infrastructure storage, such as in RSUs. This level may aggregate data from entities in hierarchy levels 1-4. The sixth level of hierarchy is storage across fixed infrastructure. This level may, for example, be located in the Core Network of a telecommunications network, or an enterprise cloud. Other types of layers and layer processing may follow from this example.

Figure 14:
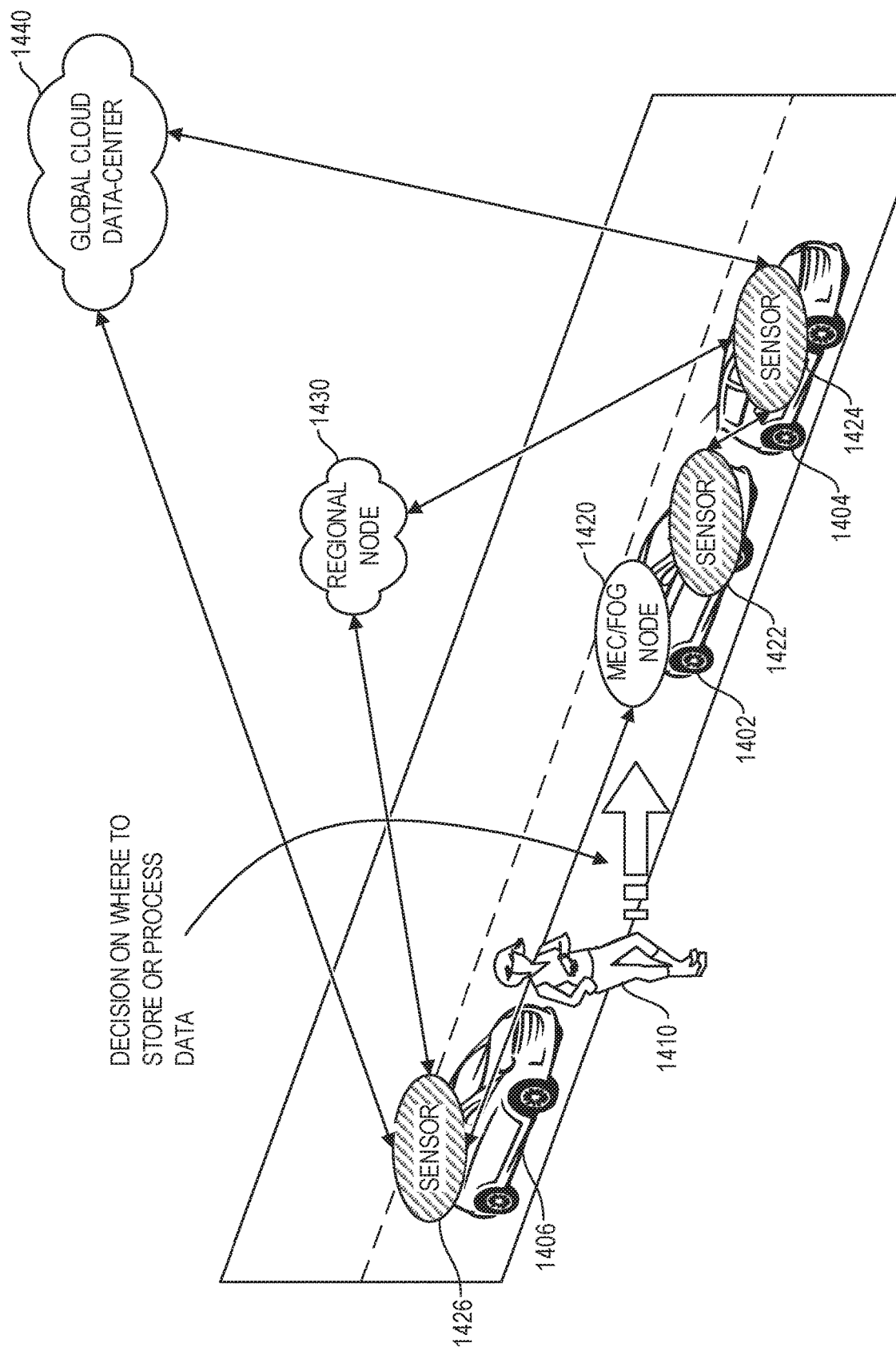
FIG. 14 illustrates MEC and FOG interaction, according to an example.

FIG. 14 illustrates MEC and FOG interaction, according to an example, which may utilize the object and tag configurations discussed herein. As shown, a series of vehicles 1402, 1404, 1406, are traveling in a roadway that is adjacent to the location of a pedestrian 1410. The respective vehicles include sensors 1422, 1424, 1426, such as sensors used to detect objects and perform vehicle operations (e.g., related to driving and vehicle movement). The coordination of data processing may occur from data collected from the sensors 1422, 1424, 1426, to MEC/FOG node 1420 (e.g., at one of the vehicles), to a regional or intermediate node 1430 (e.g. at an edge computing location), or to a cloud node 1440 (e.g., at a global data center).

From a processing perspective, depending on the real-time parameters for an application, the hierarchy levels may be more grossly segregated between the available local nodes, available regional nodes, and available global nodes. Local MEC or FOG nodes (e.g., node 1420) may be dynamically created by mobile nodes—such as cars, trucks, etc.—maintained, and terminated upon measured need (e.g., based on unfulfilled requests) for the service. In general, these nodes provide the lowest latency for storage and processing. Regional Cloud nodes (e.g., node 1430) may process data at a mid-level latency. In general, regional nodes provide more storage and processing resources than do local nodes. Global cloud data-center nodes (e.g., node 1440) may process data at a higher-latency than regional or local nodes, but generally provide greatly enhanced storage and processing capabilities. Further, aggregating data enables global optimization implementations.

In accordance with a layered MEC-FOG architecture, a mobile device (such as vehicles 1402, 1404, 1406, or other car, truck, etc.) may independently decide to host (e.g., set-up, maintain, terminate) a MEC or FOG node to offer related capabilities to the surrounding sensors, or act upon instructions of a global node which requests the set-up, maintenance and finally the termination of a MEC or FOG node. Thus, the approaches may be considered "centralized" or "decentralized" in nature.

As an example of the decentralized approach: A vehicle may identify that local ultra-low-latency data treatment is required. For example, when the vehicle is driving in a residential zone, the vehicle must be able to quickly react to a pedestrian entering the street, etc. The concerned device scans the environment for the availability of a MEC or FOG node. If such a node is available, the device connects to it and uses this node for data storage and processing. If such a node is not available, the car may independently decide (e.g., alone or after negotiating with other surrounding cars) to host a locally available MEC or FOG node with a limited lifetime.

As an example of the centralized approach: A car may request access to a locally available MEC or FOG node by sending a request to a centralized controller. If a locally available MEC or FOG node is registered to the central controller, the car is registered to the MEC/FOG node (either through the remote service or directly). If there is no locally available MEC or FOG node, the central controller may consider all cars in the surrounding area (e.g., an operational area of the network or service) and select the car to host a locally available MEC or FOG service. A selection criteria may include a car "in the middle" of a row of cars is chosen, or other criteria enabling fewer hosts to reach a larger number of users.

Figure 15:
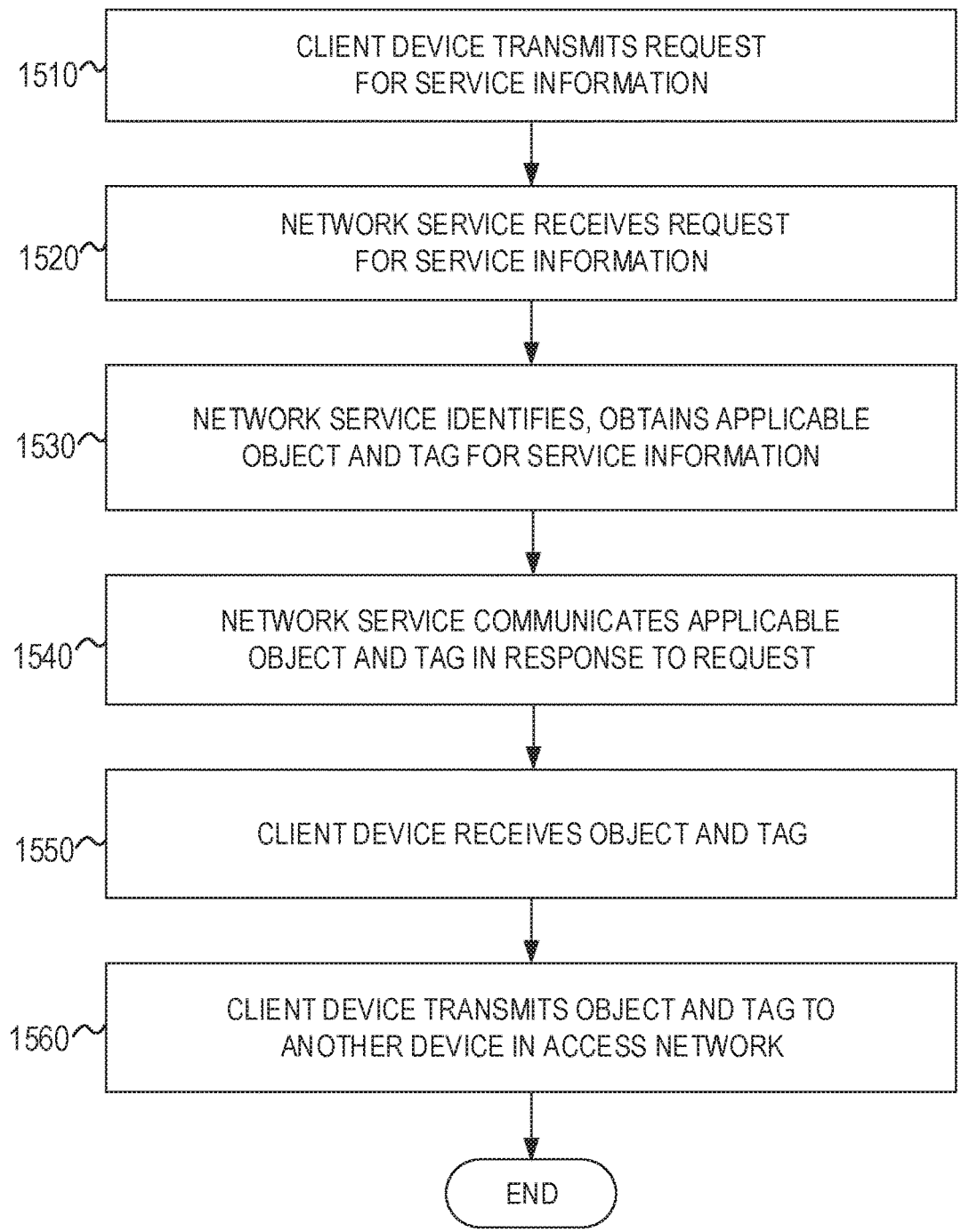
FIG. 15 illustrates a method of communicating an object and tag in a MEC-enabled information service, according to an example.

FIG. 15 depicts a flowchart 1500 of an example method for method of communicating an object and tag in a MEC-enabled information service. It will be understood that the following operations are depicted from the perspective of both device and service; however, multiple roles may be exchanged among both devices and services, and in an implementing system.

The method commences at 1510 with a client device transmitting request for service information. In an example, the request for information is transmitted to a Multi-Access Edge Computing (MEC) entity, via the access network, with the request transmitted from the device within an operational area of an information service (e.g., the area in which the information service or network can be accessed or is defined for operation, access, or has the requested capability). The method continues at 1520 with the network service receiving this request for service information. Likewise, the network may receive the request for information from a user equipment (UE) device, via the access network, as the request is received from the device within an operational area of an information service.

The flowchart 1500 continues with operations at the network service at 1530 as the service identifies and obtains an applicable object and tag for service information. In an example, this object provides data for the information service, and the tag provides the metadata related to a context of the information service and the object from another entity at another location in the operational area. This is designed such that the context of the information service is independent from the access network.

The flowchart 1500 continues with operations at 1540 as the network service transmits the object and the tag to the UE device, via the access network, in response to the request for information. The client device then receives this object and the tag at 1550. The client device at 1560 then may transmit the object and the tag to another device or entity in the access network. For instance, in this scenario, the device is included in a first vehicle moving within the operational area, the another device is a second vehicle moving within the operational area, and the object and the tag is made available in the operational area while the first vehicle and the second vehicle are mobile within the operational area.

In a specific example, the object type involves a data object (e.g., the DATA object discussed above), and the data object is structured to provide a data output from an information source located in the operational area which is connected to the MEC entity. In this manner, the tag of the data object is structured to provide a data type and classification of the data output.

In a specific example, the object type involves an application object (e.g., the APPLICATION object discussed above), and the application object is structured to enable an application to consume data from an information source located in the operational area and provide an output of data to an information sink located in the operational area, such as for the information source and the information sink that is connected to the MEC entity. Further, with this object type, the tag of the application object specifies requirements for execution of the application and requirements for the data from the information source. In a specific example, the object type involves a user object structured to consume data from an application available via the information service, for an application being connected to the MEC entity. With this object type, the tag of the user object specifies data requirements from the application and connectivity information to consume the data from the application via the information service.

Thus, in an example, the object has an object type of: a data object type, application object type, or a user object type, and the object is linked to a tag of another object via a logical link, with the another object having another object type. In this configuration, the object and the another object are spatially distributed through logical links via at least the access network. Further, the object may be communicated among multiple entities in access network via interfaces of the access network.

In further examples, the overall concept of splitting the tasks into DATA objects, APPLICATION objects, and USER objects is a generic approach and does not require use of a MEC communications architecture. Thus, references to MEC entities and features are provided in a general sense, as MEC nodes can be infrastructure components, but MEC nodes can also be processing elements in vehicles, in user devices, or in any other network entity.

In still further examples, the three object types discussed above may be divided or segmented further in sub-types, e.g. a DATA object can be split into sub-objects such as video data object, LIDAR data object, radar data object, etc.; an APPLICATION Object can be split into sub-objects such as computational processing object, memory object, etc.; or, a hierarchy of objects (including among multiple object types) may be created. Also, further object types can be added and interconnected with beyond those specifically referenced herein.

Further applicability of the present object processing and communication techniques may occur in many types of vehicle and mobile environments, including where multiple object types are used. For instance, a vehicle may intend to offer services as a DATA object, APPLICATION object, and/or USER object. If a vehicle decides to serve as DATA object, the vehicle will create a tag indicating its capabilities, wait for a connection request (or initiate the connection itself proactively), and the vehicle deliver measurement/sensing/observation data with the connected device(s). If the vehicle decides to act as an APPLICATION object, the vehicle will create a tag indicating its capabilities, wait for a connection request (or initiate the connection itself proactively), and then receive information from one or multiple other DATA object peers (to which it is connected to) and process the data, such as to extract information on obstacles from (raw/pre-processed) video/sensing data. Finally, the vehicle may operate in a role to provide the information to one or multiple USER object(s).

A variety of network implementations may be provided by the present techniques. For instance, the device of flowchart 1500 may be a mobile computing device, the MEC entity is a MEC orchestrator, and the access network is a 5G wireless network operating according to a 3GPP standards family. Further, the use of a MEC application for the information service may be based on MEC host information provided in a system information block (SIB) message communicated to the device (such as with the techniques discussed below).

Additional extensions of the presently described MEC architecture may include enhancements for mobility and access networks, and specifically, improvements in wireless communication and edge/fog processing network coordination. In the following embodiments involving 5G communications, various approaches are disclosed to enable optimal cell-association and re-selection of UEs by 5G base stations by jointly considering: (i) radio resources (e.g., transmit powers of eNBs, bandwidth information); and (ii) edge computing resources (e.g., the total processing power and the up-to-date processing load of MEC servers).

In an example, 5G radio signaling between the eNB and the UE to support MEC use cases are supplemented with use of enhanced system information block (SIB) messages. The following examples thus address the issue of (i) how to design enhanced SIB messages and proper MEC signaling in accordance with current 3GPP standards for 5G networks and with currently defined MEC technology and (ii) how to perform decisions on cell-association and re-selection of UEs to 5G base stations based on the proposed signaling and information. The technical benefits and improved result of such approaches will be apparent from the following examples.

Figure 16:
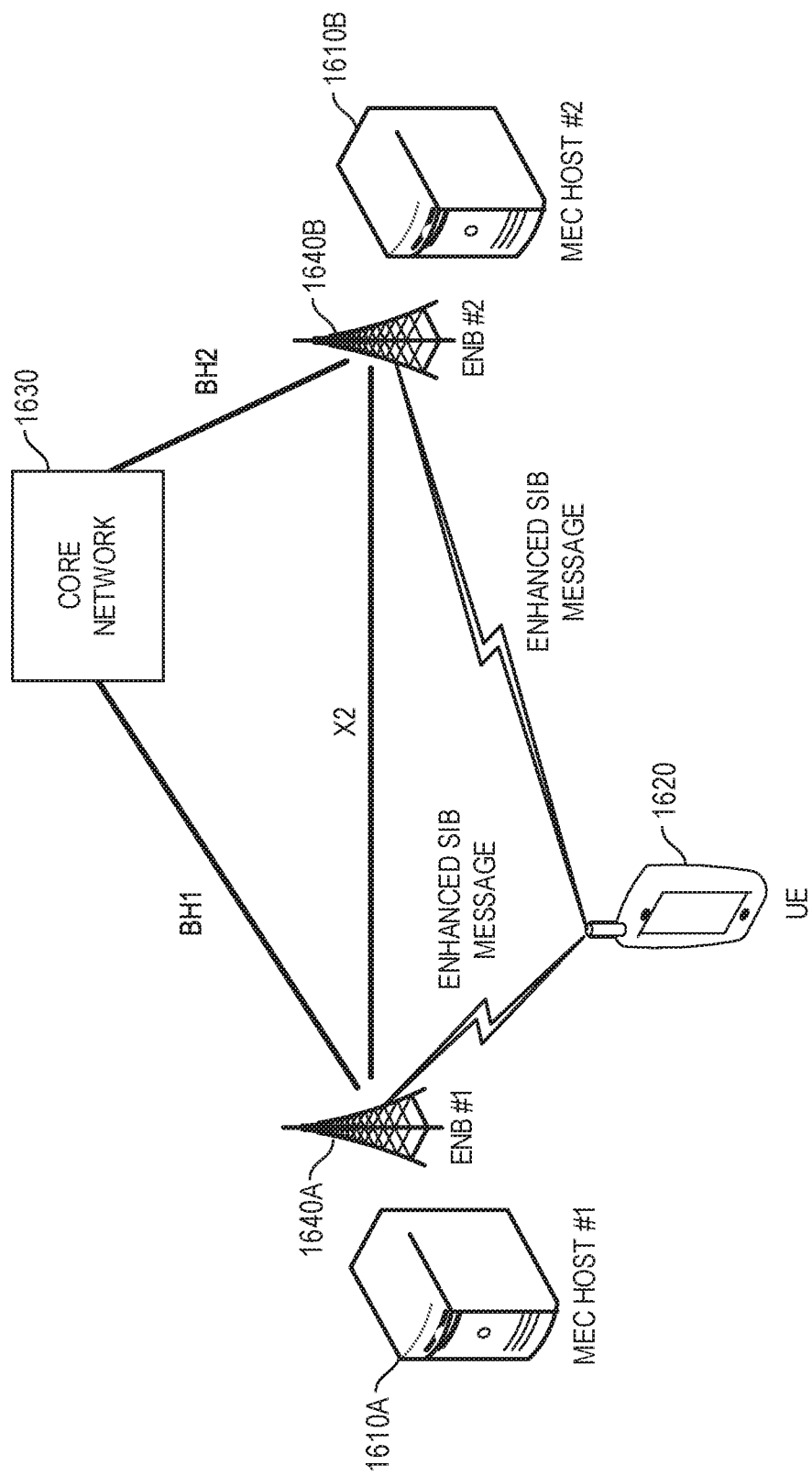
FIG. 16 illustrates a signaling network between entities in a MEC network, according to an example.

FIG. 16 illustrates a signaling network between entities in a MEC network, according to an example. As shown, a set of MEC hosts 1610A. 1610B are connected to a UE terminal 1620 via respective eNBs 1640A, 1640B. The eNBs 1640A. 1640B are in turn connected to each other via an interface (e.g., an X2 interface) and to the core network 1630 via respective interfaces (e.g., via backhaul interfaces). In various scenarios, the UE 1620 may be connected to one or both of the eNBs, and transition from coverage area of the first eNB 1640A to the second eNB 1640B. However, the usage of a MEC application, which may have been initiated with the first MEC host 1610A at the first eNB 1640A, may need to continue operation at the second MEC host 1610B when movement of the UE 1620 or other conditions causes a switch of the radio access to use of the second eNB 1640B.

Thus, in the environment depicted in FIG. 16, there will be many cases where the MEC application will be instantiated and shifted from a first host to a second host. For instance, when the UE terminal 1620 moves into a coverage area of eNB 1640A overlapping the coverage area of eNB 1640B, it may be unclear whether the UE terminal 1620 should utilize a first eNB 1640A or the other eNB 1640B. Likewise, it may be unclear whether the UE terminal 1620 is able to easily transition from a first MEC host 1610A to a second MEC host 1610B, especially if the second MEC host 1610B has resource unavailability or constraints.

Efficient end-to-end mobility management within a MEC environment is a topic which is currently under intensive study at the 5G ecosystem. Additionally, the problem of efficiently performing mobility management, by means of guaranteeing session and service continuity (SSC) during the migration of a MEC application promptly from a MEC host to another has been investigated in some recent academic publications. For instance, Ultra Dense Networks (UDNs) have been proposed as a workaround, in which information related to the associable eNBs and their co-located MEC hosts can be known to the UE as a result of a periodic, online learning procedure. However, this approach does not consider signal exchange framework at a radio level (e.g., by means of SIB broadcasting) or at a logical level. Likewise, other approaches have attempted to propose threshold-based computation migration scheme is proposed with the aim of minimizing the migration cost, while maintaining acceptable UE Quality of Service (QoS). However, such techniques do not consider radio access dimension or signaling mechanisms.

Existing solutions, although attempting to tackle the problem of optimal service migration with respect to efficient continuity and QoS, fail to provide a detailed signaling framework, inspired by and compatible to the current standardization reality. As a result, conventional systems do not consider MEC-aware system information or consider a relation to the MEC system architecture.

Based on these considerations, the following provides a design of enhanced SIB messages containing system information referring to the MEC hosts and the MEC host static and dynamic capabilities, co-located with eNBs. This provides a proper signaling framework among the involved system elements, in order to minimize the occurrence of outages stemming from the unsuccessful migration of a MEC application from one MEC host to another MEC host. In an example, an iterative mechanism is designed for broadcasting the status of MEC hosts within a given area. This mechanism can be iterated on a periodic basis (or triggered by events) to optimize the mobility management of all UEs in the system.

Figure 17:
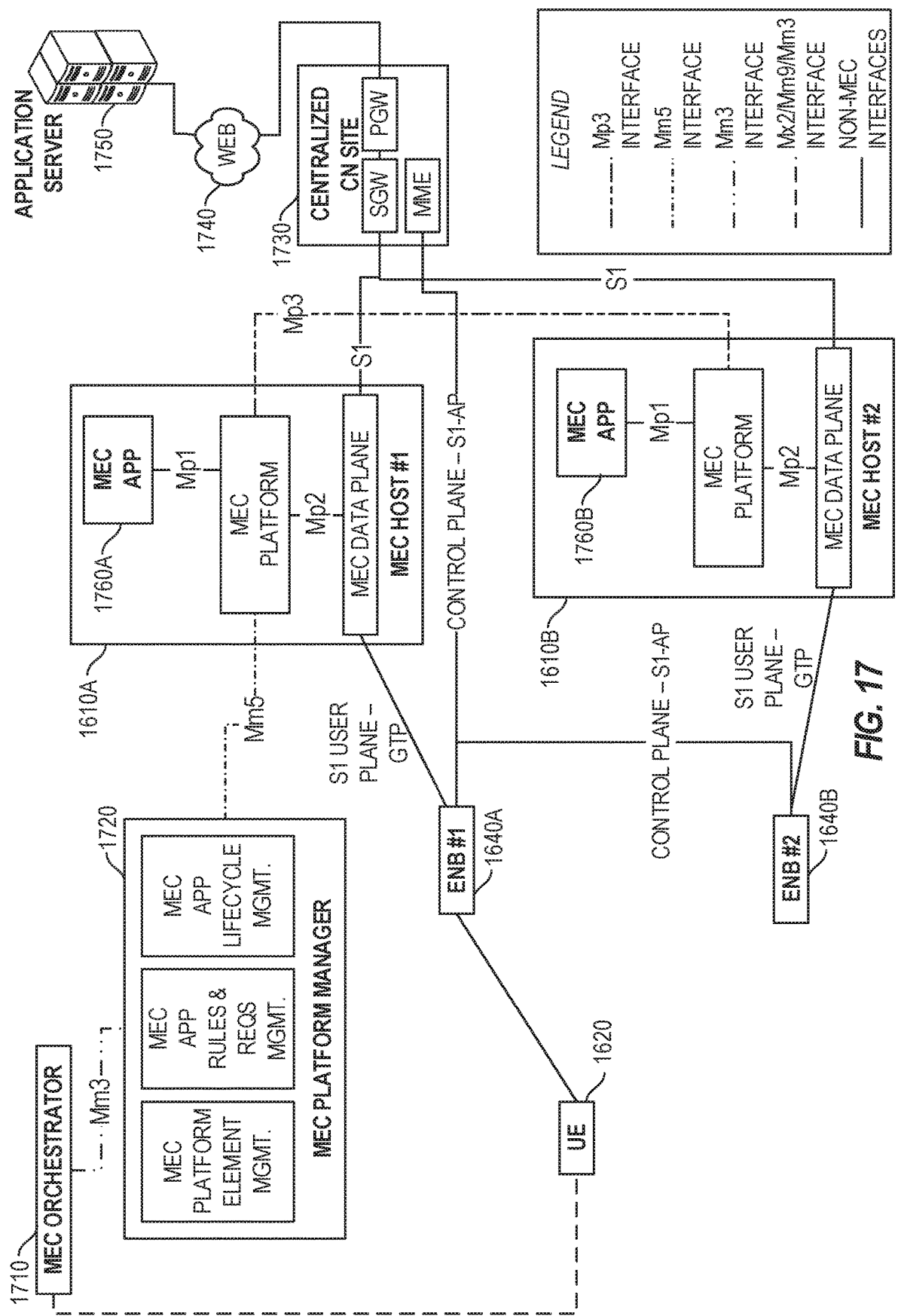
FIG. 17 illustrates a further arrangement of a MEC architecture for mobility using enhanced system information block messages, according to an example.

FIG. 17 illustrates further arrangement of a MEC architecture for mobility using enhanced SIB messages, according to an example. Specifically, FIG. 17 illustrates the entities involved in an implementing network system, which enable coordination of information among MEC entities for communication of information regarding MEC hosts 1610A. 1610B. In particular, referring to MEC architecture (in a Network Function Virtualization (NFV) environment), logical links are depicted between entities (e.g., a logical link between MEC orchestrator 1710 and UE 1620), whereas physical links (e.g., Mp, Mm, S1 interfaces, etc.) are also established among the network infrastructure components. The example illustrated in FIG. 17 is provided for an LTE network, but the extension to 5G network elements is straightforward.

In the scenario of FIG. 17. MEC entities such as the MEC orchestrator 1710, the MEC platform manager 1720, and the centralized core network (CN) site 1730 coordinate information on MEC resource availability and status. (The CN site may be further connected to an application server 1750 via the internet 1740 or other network). This resource availability and status information is identified, aggregated, and then communicated to the UE 1620 via the eNBs 1640A, 1640B. Specifically, the processing power, storage capabilities, and availability of the MEC hosts 1610 or features of the MEC hosts 1610 are collected by these MEC entities, to be communicated via an enhanced SIB message transmitted via the physical connectivity network (e.g., 4G or 5G network). The availability information may relate to the hosts 1610 or applications within the host, such as MEC applications 1760A, 1760B.

The following use of enhanced SIB messages provides evident technical benefits due to a structured use of the 4G/5G cloud infrastructure in mobility environments, in order to holistically improve the exploitation of communication and computation resources. Additionally, the following use aims to improve session and service continuity in 4G/5G systems. In an example, the system is enabled to perform MEC-aware cell-association and re-selection procedures for 5G networks (especially in high mobility scenarios) by taking into account not only radio but also computation resources within a tracking area (TA), for better satisfaction of UE QoS requirements.

In a further example, proper signaling (messages and protocols) is performed among the involved entities using a propagation of information on radio communication and computation resources. This may be accompanied by cell-association and re-selection procedures triggered by the provided information.

In an example, a definition of enhanced SIB messages transmitted by base stations may include an Enhanced SIB 1 (SystemInformationBlockType1) message, which is a system information block message enhanced with new information element sequences. As indicated below, this information element may be arranged as a SEQUENCE data type, called MECHostInfo, which includes the following new information elements indicated in TABLE 4:

TABLE 4

| Information Element | Value/remark | Comment |
| --- | --- | --- |
| MECHostInfo SEQUENCE (SIZE (4)) OF SEQUENCE { | | |
| MECHostCPU | Total processing power of the MEC host | Expressed in GFLOPS |
| MECHostMemory | Total Memory of the MEC host | Expressed in GB |
| MECHostStorageCapacity | Total Storage capacity of the MEC host | Expressed in GB |
| MECHostBarred | notBarred | For indicating possible non-availability, also due to maintenance/upgrade of the MEC host. |

(1) MECHostCPU: refers to total processing power of the MEC host, which is associated to a cell indicated by the value of the cellIdentity information element (note: the MEC host is assumed to be located at the vicinity of the eNB, and composed by N virtual machines; each VM processing power is expressed in GFLOPS);

(2) MECHostMemory refers to the memory of the MEC host (GB per each VM in the MEC host);

(3) MECHostStorageCapacity refers to the storage capacity of the MEC host (GB per each VM in the MEC host); and (4) MECHostBarred refers to the availability status of the MEC host; for example, a MEC host may be unavailable due to maintenance or upgrade-related works.

In a further example, the enhanced SIB message transmitted by a first eNB (e.g., eNB 1 1640A) includes info on a first MEC host (e.g., MEC host 1 1610A), and may include additional info on other MEC servers. This means that the UE 1620 is able to receive MEC-related information from different SIBs, and compose all information in order to have a complete view of the deployed MEC hosts in its vicinity. For example, focusing on a tracking area of three cells, eNB 1 1640A provides info on MEC host 1 1610A and MEC host 2 1610B, as they both belong to vendor A in the same operator network, while eNB 3 (not shown in FIG. 16) provides MEC-related information focusing on MEC host 3 only, as it belongs to vendor B in the same operator network.

Figure 18:
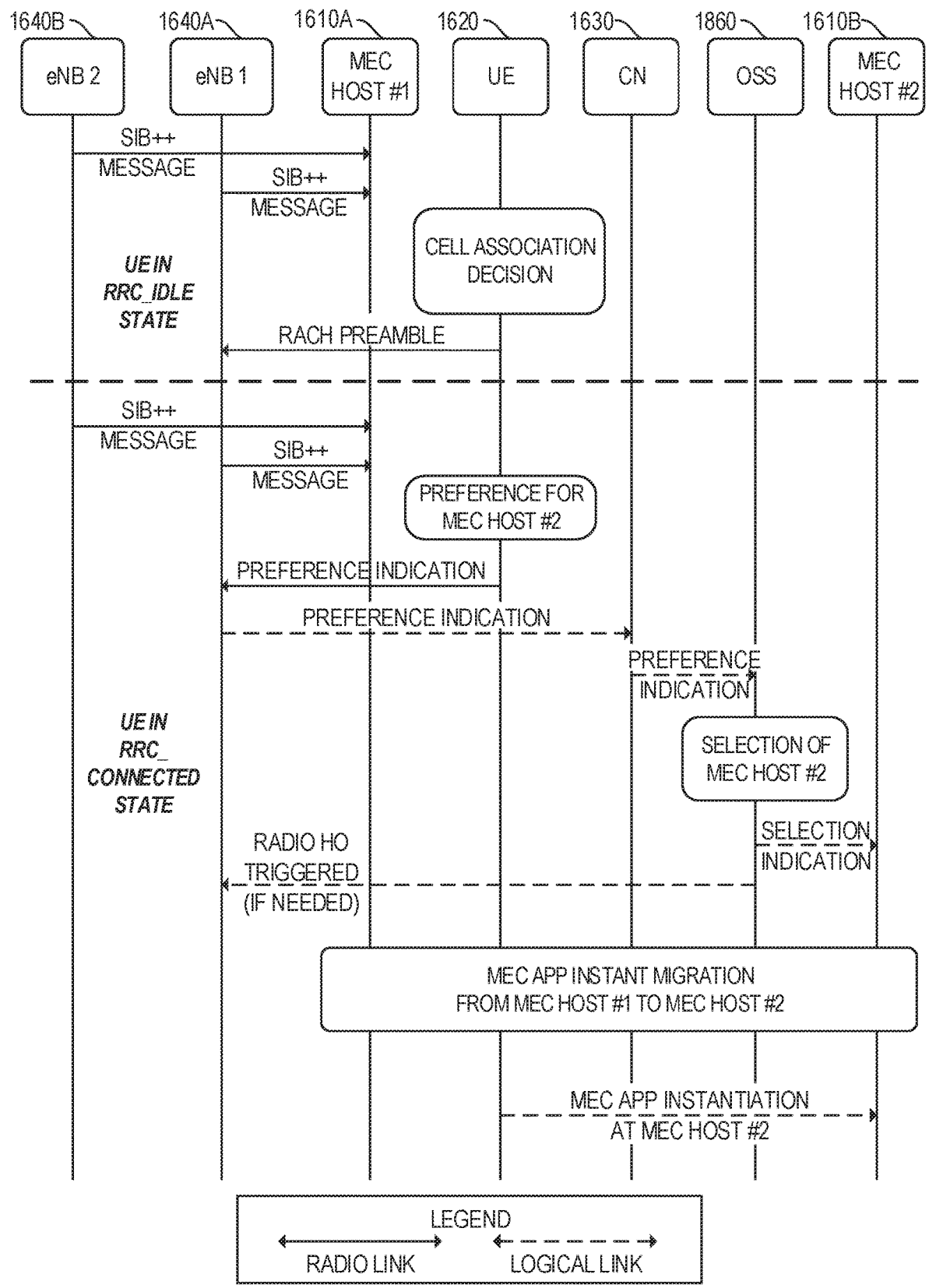
FIG. 18 illustrates a Message Sequence Chart among involved entities in idle and connected states, according to an example.

FIG. 18 illustrates a Message Sequence Chart (MSC) among the involved entities of FIG. 16, in both idle and connected states. In this example, the use of the enhanced SIB message is extended by an introduction of proper signaling (messages and protocols) among the involved entities and propagation of information on radio communication and computation resources.

The UE 1620 in RRC_IDLE state may operate as follows:

1) The initial trigger comes from eNB 1 1640A and eNB 2 1640B which transmit their enhanced SIB messages in broadcast mode. The UE that needs to establish initial access receives these messages.

2) The UE 1620, having been informed of the enhanced SIB messages transmitted by the eNBs within its tracking area decides upon camping on an eNB.

3) Assuming that the capabilities of the first MEC host 1610A co-located with eNB 1 1640A are increased, as compared to the capabilities of the second MEC host 1610B, the UE 1620 decides upon association to eNB 1 1640A.

4) Connection to eNB 1 1640A is initiated by means of a RACH preamble message transmitted by the UE.

The UE 1620 in RRC_CONNECTED state may operate as follows:

1) Assuming that the UE 1620 is connected to eNB 1 1640A, eNB 1 1640A and eNB 2 1640B broadcast their enhanced SIB messages (the periodicity of signaling is defined by the SIB messages). The UE 1620 receives this information.

2) Based on the updated SIB messages, the UE 1620 indicates its preference for migrating (relocating) its MEC app instance from MEC host #1 1610A to MEC host #2 1610B.

3) The UE 1620 informs eNB 1 1640A of its preference.

4) eNB 1 1640A informs the OSS 1860 (through the CN 1630) of the UE preference for MEC app instance migration to MEC host #2 1610B.

5) Through the MEC system, the OSS 1860 informs MEC host #2 1610B of the preference of the UE 1620 for MEC app instance migration.

6) If needed, the OSS 1860 informs eNB 1 1640A to trigger a radio handover procedure.

7) MEC app instance migration from MEC host #1 1610A to MEC host #2 1610B takes place.

8) The MEC app of the UE 1620 is instantiated at MEC host #2 1610B.

In further examples, cell-association and re-selection procedures may be triggered by the provided information. Every decision point depicted in FIG. 18, for example, can be implemented with use of different possible algorithms, which can be considered as possible implementations of the present techniques. Examples of associations and re-selections are described in the following.

A) Initial Cell association (UE in RRC_IDLE state). Based on the updated enhanced SIB messages, the UE 1620 is establishing initial access with one of the eNBs. This decision can be taken based both on radio conditions and computational resources. As an example, a certain UE receiving similar signal strength from two eNBs, can privilege the one associated with the best MEC Host.

In further examples, the decision for initial cell association can be made based on: 1) the Enhanced SIB message, 2) another existing SIB enhanced with MEC information (similarly to the enhanced SIB message discussed above), carrying more dynamic characteristics on the MEC host associated to the cell, or 3) New dedicated SIBs, transmitted more frequently by the cell, and carrying information on neighbors' MEC hosts, as well as more dynamic characteristics of the MEC hosts. In any case, for the first access, typically more basic signaling is used by the UE, so it can privilege (for the first access) the reception of the enhanced SIB message coming from the received cells.

B) Cell re-selection (UE in RRC_CONNECTED state). Based on the updated enhanced SIB messages, the UE is providing an indication about the preferred MEC host. This message can trigger mobility procedures (at radio level and/or at MEC level), or can be simply neglected by the MEC system and 5G core network, since UE messages are only indications, but at the end every decision is taken at the network side.

In further examples, different scenarios for cell re-selection may occur based on cases where: 1) The UE is static, or in any case always connected to the same eNB, but indicating a different preferred MEC host (not associated to the present eNB): then the indication is propagated to the MEC system (as in FIG. 18) for a proper decision (e.g. the MEC system may even decide to override this indication); 2) The UE is moving (i.e. radio mobility), thus connecting to a different eNB and sending the message on the same preferred MEC host as before: in this case there is no MEC mobility procedure, but a new association of the MEC host is triggered (unless the MEC system decides otherwise); 3) The UE is moving, connecting to a different eNB and sending the message on a new preferred MEC host: then the indication is propagated to the MEC system (as in FIG. 18) for a proper decision on MEC mobility (e.g. the MEC system may even decide to override this indication, and instead maintain the same MEC host).

The decision on radio and MEC mobility may be taken from the network side (e.g., from a 5G CN in alignment with the MEC system) based both on radio conditions and computational resources. As an example, possible outcomes may include:

1) No mobility procedure is triggered (neither radio nor MEC);

2) MEC-only mobility procedure is triggered (e.g. from MEC host to MEC2 host), but radio access link is maintained with eNB1 (e.g. for coverage/radio capacity reasons, and a good BH link); or 3) Radio mobility procedure is triggered, to support a subsequent MEC mobility (because end-to-end performance with the new MEC host may be improved only by means of both mobility procedures).

In a further example, the transmission of the presently described enhanced SIB messages is performed on a periodic basis or triggered by events. This mechanism enables the UE to update the indications to the network in order to trigger mobility procedures.

Figure 19:
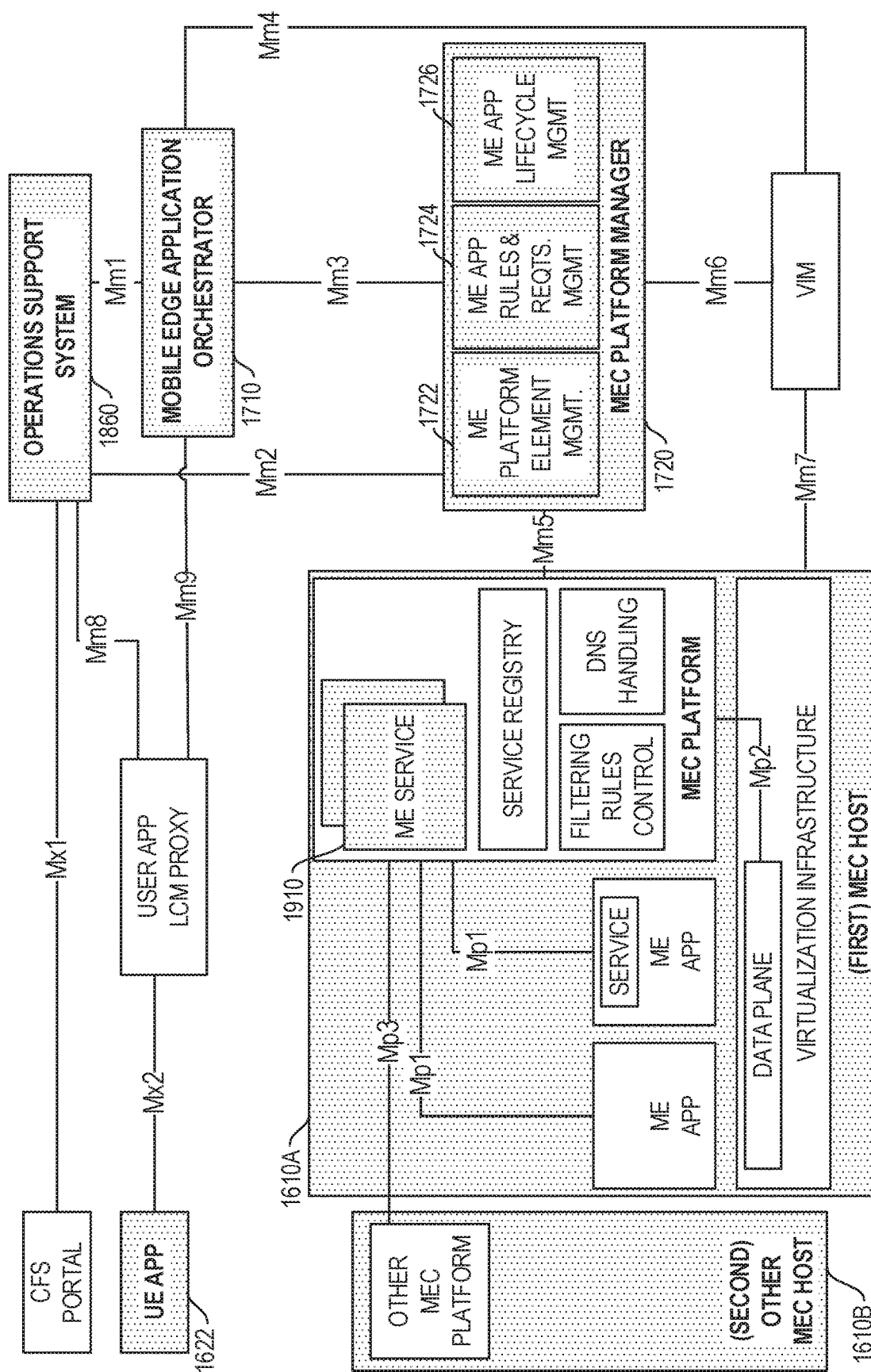
FIG. 19 illustrates a further overview of a MEC architecture, using enhanced system information block messages, according to an example.

FIG. 19 provides a further overview of a MEC architecture (according to the ETSI ISG MEC-003 specification). In this scenario, some of the MEC elements of FIG. 16 are also included, and are depicted as shaded blocks (MEC host 1610A, MEC host 1610B, UE app 1622, mobile edge application orchestrator 1710, MEC platform manager 1720. ME platform element management 1722, ME application rules and requirements management 1724, ME application lifecycle management 1726, operations support system 1860, and ME service 1910) as the entities involved with implementing and processing the presently enhanced SIB message.

Figure 20:
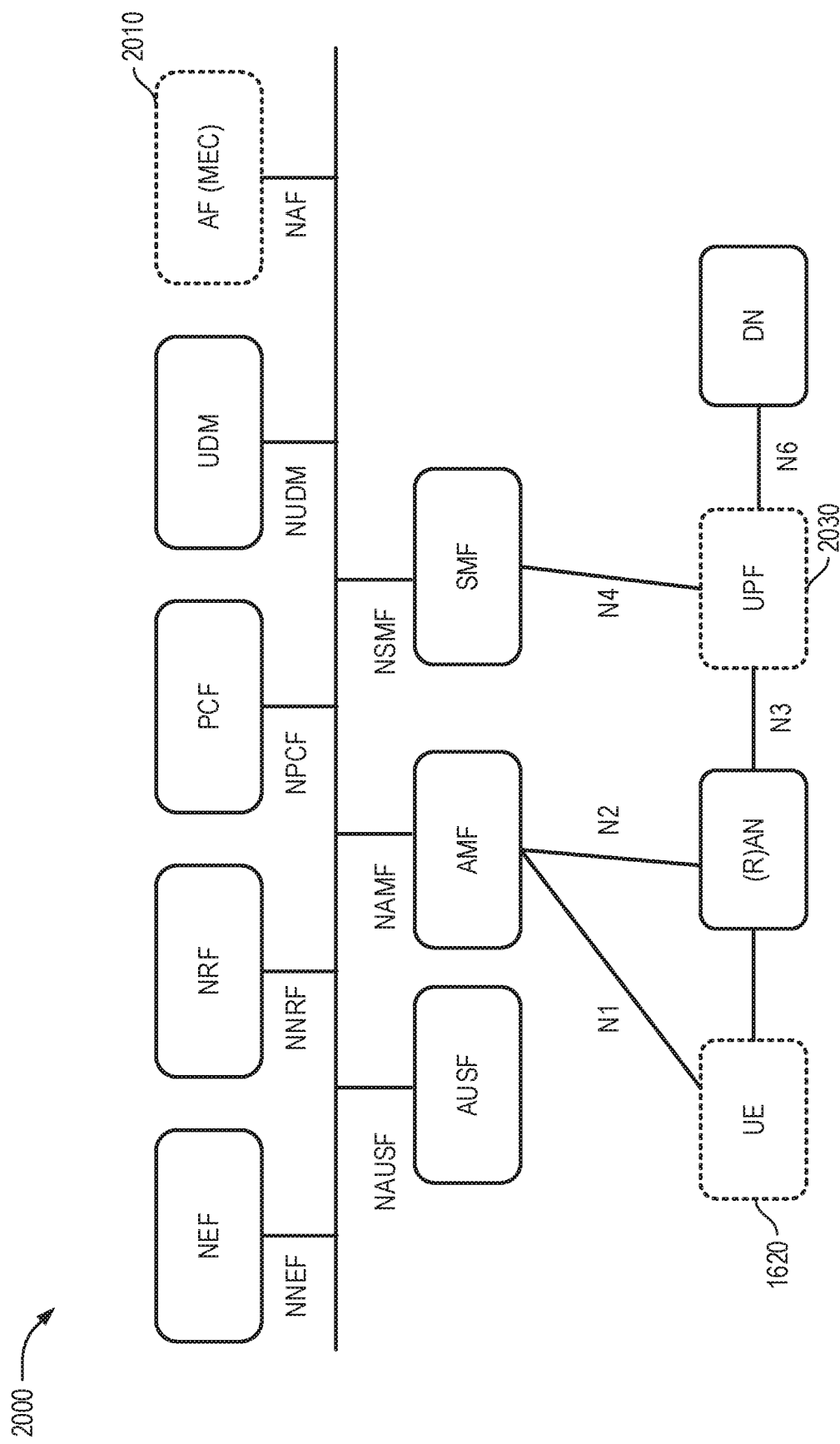
FIG. 20 illustrates a further context of MEC entities, in relation to a 5G architecture, according to an example.

FIG. 20 illustrates a further context of the presently described MEC entities, in relation to a 5G architecture. The ME platform, for instance, is roughly correlated to the functions performed by an Application Function (AF) 2010 and a User Plane Function (UPF) 2030 relative to the UE 1620. It will be understood, accordingly, that the MEC functionalities and capabilities (including those of the enhanced SIB message) may be extended to use within a 5G architecture, including with or without use of the MEC system environment discussed above.

The definition of an Application Function (AF) in 3GPP 5G architectures include high level functionalities for application influence on traffic routing, accessing Network Capability Exposure, and interaction with the Policy framework for policy control. According to this definition, the logical AF in the 3GPP architecture may correspond to some functionalities defined in ETSI MEC for a ME platform.

Further, the definition of User Plane Function(s) (UPFs) in 3GPP 5G architectures include functionalities for handling the user plane path of PDU sessions, and an UPF that provides the interface to a Data Network supports the functionality of a PDU session anchor. According to this definition, the logical UPF in the 3GPP architecture may correspond to the Data plane defined in ETSI MEC within the NFVI entity of the MEC architecture.

Figure 21:
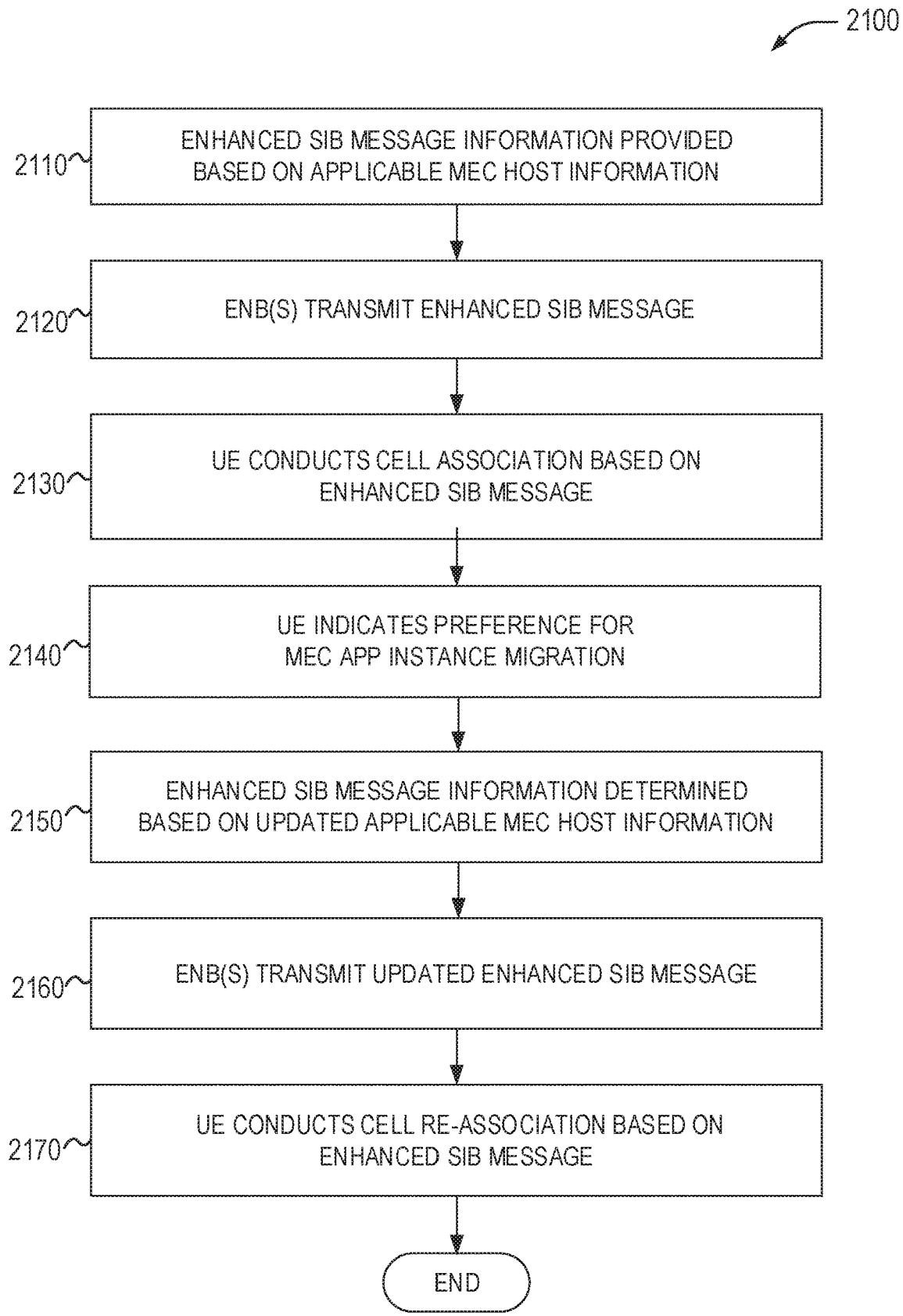
FIG. 21 illustrates a flowchart of a method for utilizing enhanced system information blocks, according to an example.

FIG. 21 depicts a flowchart of a method for utilizing enhanced system information blocks, such as based on use of the techniques discussed above. These may include operations that: at 2110, provide enhanced SIB message information, based on applicable MEC host information; at 2120, transmit enhanced SIB message(s) from eNB(s); at 2130, conduct cell association from the UE based on the enhanced SIB message(s); at 2140, indicate preference from the UE for a MEC application instance migration; at 2150, determine enhanced SIB message information based on updated applicable MEC host information; at 2160, transmit updated enhanced SIB message(s) from the eNB(s); at 2170, conduct cell re-association at the UE based on the enhanced SIB message.

Any of the radio links described herein may operate according to any one or more of the following radio communication technologies and/or standards including but not limited to: a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology, for example Universal Mobile Telecommunications System (UMTS). Freedom of Multimedia Access (FOMA), 3GPP Long Term Evolution (LTE), 3GPP Long Term Evolution Advanced (LTE Advanced), Code division multiple access 2000 (CDMA2000), Cellular Digital Packet Data (CDPD). Mobitex, Third Generation (3G), Circuit Switched Data (CSD), High-Speed Circuit-Switched Data (HSCSD), Universal Mobile Telecommunications System (Third Generation) (UMTS (3G)). Wideband Code Division Multiple Access (Universal Mobile Telecommunications System) (W-CDMA (UMTS)), High Speed Packet Access (HSPA), High-Speed Downlink Packet Access (HSDPA), High-Speed Uplink Packet Access (HSUPA), High Speed Packet Access Plus (HSPA+). Universal Mobile Telecommunications System-Time-Division Duplex (UMTS-TDD). Time Division-Code Division Multiple Access (TD-CDMA), Time Division-Synchronous Code Division Multiple Access (TD-CDMA), 3rd Generation Partnership Project Release 8 (Pre-4th Generation) (3GPP Rel, 8 (Pre-4G)), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 13 (3rd Generation Partnership Project Release 13), 3GPP Rel. 14 (3rd Generation Partnership Project Release 14), 3GPP Rel. 15 (3rd Generation Partnership Project Release 15), 3GPP Rel. 16 (3rd Generation Partnership Project Release 16), 3GPP Rel. 17 (3rd Generation Partnership Project Release 17) and subsequent Releases (such as Rel. 18. Rel. 19, etc.), 3GPP 5G, 3GPP LTE Extra, LTE-Advanced Pro, LTE Licensed-Assisted Access (LAA), MuLTEfire, UMTS Terrestrial Radio Access (UTRA), Evolved UMTS Terrestrial Radio Access (E-UTRA), Long Term Evolution Advanced (4th Generation) (LTE Advanced (4G)), cdmaOne (2G), Code division multiple access 2000 (Third generation) (CDMA2000 (3G)), Evolution-Data Optimized or Evolution-Data Only (EV-DO). Advanced Mobile Phone System (1st Generation) (AMPS (1G)). Total Access Communication System/Extended Total Access Communication System (TACS/ETACS), Digital AMPS (2nd Generation) (D-AMPS (2G)), Push-to-talk (PTT). Mobile Telephone System (MTS), Improved Mobile Telephone System (IMTS). Advanced Mobile Telephone System (AMTS), OLT (Norwegian for Offentlig Landmobil Telefoni. Public Land Mobile Telephony), MTD (Swedish abbreviation for Mobiltelefonisystem D, or Mobile telephony system D), Public Automated Land Mobile (Autotel/PALM). ARP (Finnish for Autoradiopuhelin. "car radio phone"), NMT (Nordic Mobile Telephony), High capacity version of NTT (Nippon Telegraph and Telephone) (Hicap). Cellular Digital Packet Data (CDPD). Mobitex, DataTAC, Integrated Digital Enhanced Network (iDEN), Personal Digital Cellular (PDC). Circuit Switched Data (CSD), Personal Handy-phone System (PHS), Wideband Integrated Digital Enhanced Network (WiDEN), iBurst, Unlicensed Mobile Access (UMA), also referred to as also referred to as 3GPP Generic Access Network, or GAN standard), Zigbee. Bluetooth®, Wireless Gigabit Alliance (WiGig) standard, mmWave standards in general (wireless systems operating at 10-300 GHz and above such as WiGig, IEEE 802.1 lad. IEEE 802.1 lay, etc.), technologies operating above 300 GHz and THz bands, (3GPP/LTE based or IEEE 802.11p and other) Vehicle-to-Vehicle (V2V) and Vehicle-to-X (V2X) and Vehicle-to-Infrastructure (V2I) and Infrastructure-to-Vehicle (I2V) communication technologies, 3GPP cellular V2X. DSRC (Dedicated Short Range Communications) communication systems such as Intelligent-Transport-Systems and others (typically operating in 5850 MHz to 5925 MHz), the European ITS-G5 system (i.e. the European flavor of IEEE 802.11p based DSRC, including ITS-GSA (i.e., Operation of ITS-G5 in European ITS frequency bands dedicated to ITS for safety related applications in the frequency range 5,875 GHz to 5,905 GHz). ITS-G5B (i.e., Operation in European ITS frequency bands dedicated to ITS non-safety applications in the frequency range 5.855 GHz to 5,875 GHz), ITS-G5C (i.e., Operation of ITS applications in the frequency range 5,470 GHz to 5,725 GHz)), DSRC in Japan in the 700 MHz band (including 715 MHz to 725 MHz) etc.

Aspects described herein can be used in the context of any spectrum management scheme including dedicated licensed spectrum, unlicensed spectrum. (licensed) shared spectrum (such as LSA=Licensed Shared Access in 2.3-2.4 GHz, 3.4-3.6 GHz, 3.6-3.8 GHz and further frequencies and SAS=Spectrum Access System/CBRS=Citizen Broadband Radio System in 3.55-3.7 GHz and further frequencies). Applicable spectrum bands include IMT (International Mobile Telecommunications) spectrum as well as other types of spectrum/bands, such as bands with national allocation (including 450-470 MHz, 902-928 MHz (note: allocated for example in US (FCC Part 15)), 863-868.6 MHz (note: allocated for example in European Union (ETSI EN 300 220)), 915.9-929.7 MHz (note: allocated for example in Japan), 917-923.5 MHz (note: allocated for example in South Korea), 755-779 MHz and 779-787 MHz (note: allocated for example in China), 790-960 MHz, 1710-2025 MHz, 2110-2200 MHz, 2300-2400 MHz, 2.4-2.4835 GHz (note: it is an ISM band with global availability and it is used by Wi-Fi technology family (11b/g/n/ax) and also by Bluetooth), 2500-2690 MHz, 698-790 MHz, 610-790 MHz, 3400-3600 MHz, 3400-3800 MHz, 3.55-3.7 GHz (note: allocated for example in the US for Citizen Broadband Radio Service), 5.15-5.25 GHz and 5.25-5.35 GHz and 5.47-5.725 GHz and 5.725-5.85 GHz bands (note: allocated for example in the US (FCC part 15), consists four U-NII bands in total 500 MHz spectrum), 5.725-5.875 GHz (note: allocated for example in EU (ETSI EN 301 893)), 5.47-5.65 GHz (note: allocated for example in South Korea, 5925-7125 MHz and 5925-6425 MHz band (note: under consideration in US and EU, respectively), IMT-advanced spectrum, IMT-2020 spectrum (expected to include 3600-3800 MHz, 3.5 GHz bands, 700 MHz bands, bands within the 24.25-86 GHz range, etc.), spectrum made available under FCC's "Spectrum Frontier" 5G initiative (including 27.5-28.35 GHz, 29.1-29.25 GHz, 31-31.3 GHz, 37-38.6 GHz, 38.6-40 GHz, 42-42.5 GHz, 57-64 GHz, 71-76 GHz, 81-86 GHz and 92-94 GHz, etc), the ITS (Intelligent Transport Systems) band of 5.9 GHz (typically 5.85-5.925 GHz) and 63-64 GHz, bands currently allocated to WiGig such as WiGig Band 1 (57.24-59.40 GHz), WiGig Band 2 (59.40-61.56 GHz) and WiGig Band 3 (61.56-63.72 GHz) and WiGig Band 4 (63.72-65.88 GHz), 57-64/66 GHz (e.g., having near-global designation for Multi-Gigabit Wireless Systems (MGWS)/WiGig; in US (FCC part 15) allocated as total 14 GHz spectrum, while EU (ETSI EN 302 567 and ETSI EN 301 217-2 for fixed P2P) allocated as total 9 GHz spectrum), the 70.2 GHz-71 GHz band, any band between 65.88 GHz and 71 GHz, bands currently allocated to automotive radar applications such as 76-81 GHz, and future bands including 94-300 GHz and above. Furthermore, the scheme can be used on a secondary basis on bands such as the TV White Space bands (typically below 790 MHz) where in particular the 400 MHz and 700 MHz bands are promising candidates. Besides cellular applications, specific applications for vertical markets may be addressed such as PMSE (Program Making and Special Events), medical, health, surgery, automotive, low-latency, drones, etc. applications.

Aspects described herein can also implement a hierarchical application of the scheme is possible, e.g. by introducing a hierarchical prioritization of usage for different types of users (e.g., low/medium/high priority, etc.), based on a prioritized access to the spectrum e.g. with highest priority to tier-1 users, followed by tier-2, then tier-3, etc. users, etc.

Aspects described herein can also be applied to different Single Carrier or OFDM flavors (CP-OFDM, SC-FDMA, SC-OFDM, filter bank-based multicarrier (FBMC), OFDMA, etc.) and in particular 3GPP NR (New Radio) by allocating the OFDM carrier data bit vectors to the corresponding symbol resources.]. Some of the features in this document are defined for the network side, such as Access Points, eNodeBs. New Radio (NR) or next generation Node Bs (gNodeB or gNB), such as used in the context of 3GPP fifth generation (5G) communication systems, etc. Still, a User Equipment (UE) may take this role as well and act as an Access Points, eNodeBs, gNodeBs, etc. Accordingly, some or all features defined for network equipment may be implemented by a UE or a mobile computing device.

Figure 22:
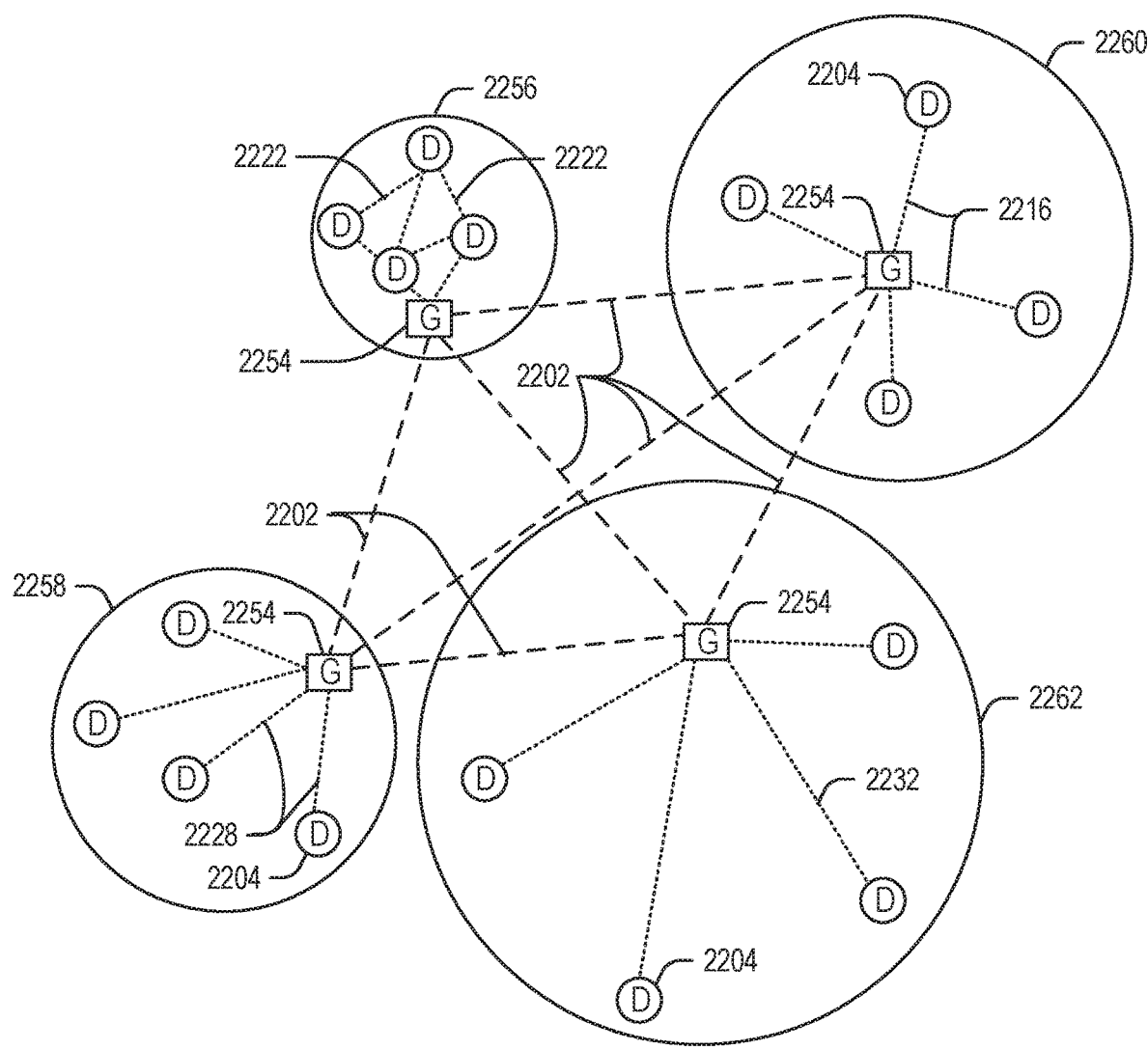
FIG. 22 illustrates a domain topology for respective internet-of-things (IoT) networks coupled through links to respective gateways, according to an example.

In further examples, the preceding examples of network communications and operations may be integrated with IoT and like device-based network architectures. FIG. 22 illustrates an example domain topology for respective IoT networks coupled through links to respective gateways. The IoT is a concept in which a large number of computing devices are interconnected to each other and to the Internet to provide functionality and data acquisition at very low levels. Thus, as used herein, an IoT device may include a semiautonomous device performing a function, such as sensing or control, among others, in communication with other IoT devices and a wider network, such as the Internet.

MEC use cases have been envisioned to integrate into a number of network and application settings, including those to support network arrangements of IoT deployments. IoT devices are physical or virtualized objects that may communicate on a network (typically at the edge or endpoint of a network), and may include sensors, actuators, and other input/output components, such as to collect data or perform actions from a real world environment. For example, IoT devices may include low-powered devices that are embedded or attached to everyday things, such as buildings, vehicles, packages, etc., to provide sensor, data, or processing functionality. Recently. IoT devices have become more popular and thus applications and use cases using these devices have proliferated.

Various standards have been proposed to more effectively interconnect and operate IoT devices and IoT network use cases, including those with MEC and mobile network architectures. Some of the relevant communication and network architecture standards include those distributed by groups such as ETSI, 3rd Generation Partnership Project (3GPP), Institute of Electrical and Electronics Engineers (IEEE), in addition to specialized IoT application interaction architecture and configuration standards distributed by working groups such as the Open Connectivity Foundation (OCF).

Often. IoT devices are limited in memory, size, or functionality, enabling larger numbers to be deployed for a similar cost to smaller numbers of larger devices. However, an IoT device may be a smart phone, laptop, tablet, or PC, or other larger device. Further, an IoT device may be a virtual device, such as an application on a smart phone or other computing device. IoT devices may include IoT gateways, used to couple IoT devices to other IoT devices and to cloud applications, for data storage, process control, and the like.

Networks of IoT devices may include commercial and home automation devices, such as water distribution systems, electric power distribution systems, pipeline control systems, plant control systems, light switches, thermostats, locks, cameras, alarms, motion sensors, and the like. The IoT devices may be accessible through remote computers, servers, and other systems, for example, to control systems or access data.

The future growth of the Internet and like networks may involve very large numbers of IoT devices. Accordingly, in the context of the techniques discussed herein, a number of innovations for such future networking will address the need for all these layers to grow unhindered, to discover and make accessible connected resources, and to support the ability to hide and compartmentalize connected resources. Any number of network protocols and communications standards may be used, wherein each protocol and standard is designed to address specific objectives. Further, the protocols are part of the fabric supporting human accessible services that operate regardless of location, time or space. The innovations include service delivery and associated infrastructure, such as hardware and software; security enhancements; and the provision of services based on Quality of Service (QoS) terms specified in service level and service delivery agreements. As will be understood, the use of IoT devices and networks present a number of new challenges in a heterogeneous network of connectivity comprising a combination of wired and wireless technologies.

FIG. 22 specifically provides a simplified drawing of a domain topology that may be used for a number of IoT networks comprising IoT devices 2204, with the IoT networks 2256, 2258, 2260, 2262, coupled through backbone links 2202 to respective gateways 2254. For example, a number of IoT devices 2204 may communicate with a gateway 2254, and with each other through the gateway 2254. To simplify the drawing, not every IoT device 2204, or communications link (e.g., link 2216, 2222, 2228, or 2232) is labeled. The backbone links 2202 may include any number of wired or wireless technologies, including optical networks, and may be part of a local area network (LAN), a wide area network (WAN), or the Internet. Additionally, such communication links facilitate optical signal paths among both IoT devices 2204 and gateways 2254, including the use of MUXing/deMUXing components that facilitate interconnection of the various devices.

The network topology may include any number of types of IoT networks, such as a mesh network provided with the network 2256 using Bluetooth low energy (BLE) links 2222. Other types of IoT networks that may be present include a wireless local area network (WLAN) network 2258 used to communicate with IoT devices 2204 through IEEE 802.11 (Wi-Fi®) links 2228, a cellular network 2260 used to communicate with IoT devices 2204 through an LTE/LTE-A (4G) or 5G cellular network, and a low-power wide area (LPWA) network 2262, for example, a LPWA network compatible with the LoRaWan specification promulgated by the LoRa alliance, or a IPv6 over Low Power Wide-Area Networks (LPWAN) network compatible with a specification promulgated by the Internet Engineering Task Force (IETF). Further, the respective IoT networks may communicate with an outside network provider (e.g., a tier 2 or tier 3 provider) using any number of communications links, such as an LTE cellular link, an LPWA link, or a link based on the IEEE 802.15.4 standard, such as Zigbee®. The respective IoT networks may also operate with use of a variety of network and internet application protocols such as Constrained Application Protocol (CoAP). The respective IoT networks may also be integrated with coordinator devices that provide a chain of links that forms cluster tree of linked devices and networks.

Each of these IoT networks may provide opportunities for new technical features, such as those as described herein. The improved technologies and networks may enable the exponential growth of devices and networks, including the use of IoT networks into fog devices or systems. As the use of such improved technologies grows, the IoT networks may be developed for self-management, functional evolution, and collaboration, without needing direct human intervention. The improved technologies may even enable IoT networks to function without centralized controlled systems. Accordingly, the improved technologies described herein may be used to automate and enhance network management and operation functions far beyond current implementations.

In an example, communications between IoT devices 2204, such as over the backbone links 2202, may be protected by a decentralized system for authentication, authorization, and accounting (AAA). In a decentralized AAA system, distributed payment, credit, audit, authorization, and authentication systems may be implemented across interconnected heterogeneous network infrastructure. This enables systems and networks to move towards autonomous operations. In these types of autonomous operations, machines may even contract for human resources and negotiate partnerships with other machine networks. This may enable the achievement of mutual objectives and balanced service delivery against outlined, planned service level agreements as well as achieve solutions that provide metering, measurements, traceability and trackability. The creation of new supply chain structures and methods may enable a multitude of services to be created, mined for value, and collapsed without any human involvement.

Such IoT networks may be further enhanced by the integration of sensing technologies, such as sound, light, electronic traffic, facial and pattern recognition, smell, vibration, into the autonomous organizations among the IoT devices. The integration of sensory systems may enable systematic and autonomous communication and coordination of service delivery against contractual service objectives, orchestration and QoS-based swarming and fusion of resources. Some of the individual examples of network-based resource processing include the following.

The mesh network 2256, for instance, may be enhanced by systems that perform inline data-to-information transforms. For example, self-forming chains of processing resources comprising a multi-link network may distribute the transformation of raw data to information in an efficient manner, and the ability to differentiate between assets and resources and the associated management of each. Furthermore, the proper components of infrastructure and resource based trust and service indices may be inserted to improve the data integrity, quality, assurance and deliver a metric of data confidence.

The WLAN network 2258, for instance, may use systems that perform standards conversion to provide multi-standard connectivity, enabling IoT devices 2204 using different protocols to communicate. Further systems may provide seamless interconnectivity across a multi-standard infrastructure comprising visible Internet resources and hidden Internet resources.

Communications in the cellular network 2260, for instance, may be enhanced by systems that offload data, extend communications to more remote devices, or both. The LPWA network 2262 may include systems that perform non-Internet protocol (IP) to IP interconnections, addressing, and routing. Further, each of the IoT devices 2204 may include the appropriate transceiver for wide area communications with that device. Further, each IoT device 2204 may include other transceivers for communications using additional protocols and frequencies. This is discussed further with respect to the communication environment and hardware of an IoT processing device depicted in FIGS. 24 and 25.

Finally, clusters of IoT devices may be equipped to communicate with other IoT devices as well as with a cloud network. This may enable the IoT devices to form an ad-hoc network between the devices, enabling them to function as a single device, which may be termed a fog device, fog platform, or fog network. This configuration is discussed further with respect to FIG. 23 below.

Figure 23:
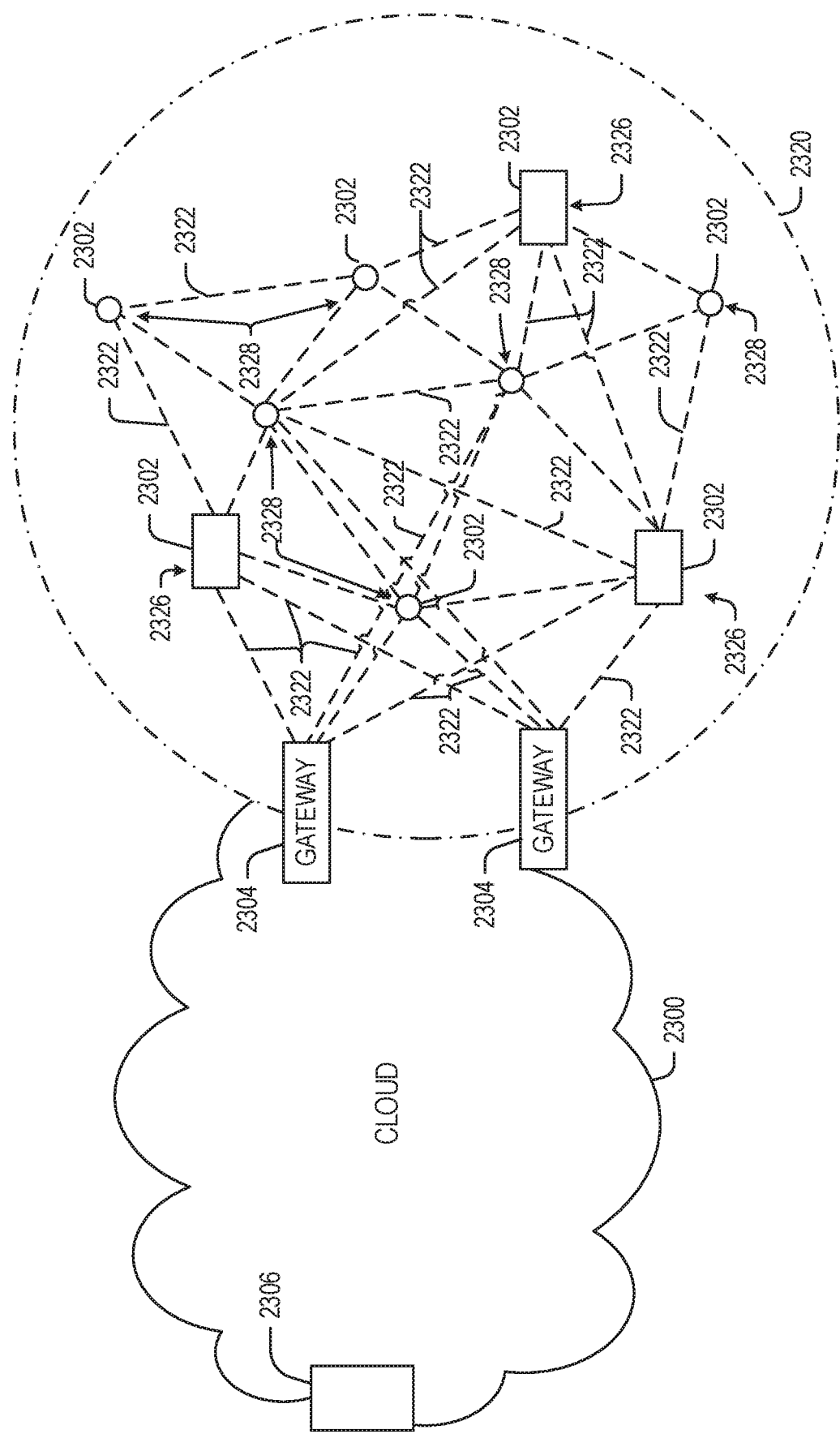
FIG. 23 illustrates a cloud-computing network in communication with a mesh network of IoT/endpoint devices operating as a fog device at the edge of the cloud-computing network, according to an example.

FIG. 23 illustrates a cloud computing network in communication with a mesh network of IoT devices (devices 2302) operating as a fog platform in a networked scenario. The mesh network of IoT devices may be termed a fog network 2320, established from a network of devices operating at the edge of the cloud 200. To simplify the diagram, not every IoT device 2302 is labeled.

The fog network 2320 may be considered to be a massively interconnected network wherein a number of IoT devices 2302 are in communications with each other, for example, by radio links 2322. The fog network 2320 may establish a horizontal, physical or virtual resource platform that can be considered to reside between IoT edge devices and cloud or data centers. A fog network, in some examples, may support vertically-isolated, latency-sensitive applications through layered, federated, or distributed computing, storage, and network connectivity operations. However, a fog network may also be used to distribute resources and services at and among the edge and the cloud. Thus, references in the present document to the "edge", "fog", and "cloud" are not necessarily discrete or exclusive of one another.

As an example, the fog network 2320 may be facilitated using an interconnect specification released by the Open Connectivity Foundation™ (OCF). This standard enables devices to discover each other and establish communications for interconnects. Other interconnection protocols may also be used, including, for example, the optimized link state routing (OLSR) Protocol, the better approach to mobile ad-hoc networking (B.A.T.M.A.N.) routing protocol, or the OMA Lightweight M2M (LWM2M) protocol, among others.

Three types of IoT devices 2302 are shown in this example, gateways 2304, data aggregators 2326, and sensors 2328, although any combinations of IoT devices 2302 and functionality may be used. The gateways 2304 may be edge devices that provide communications between the cloud 2300 and the fog 2320, and may also provide the backend process function for data obtained from sensors 2328, such as motion data, flow data, temperature data, and the like. The data aggregators 2326 may collect data from any number of the sensors 2328, and perform the back end processing function for the analysis. The results, raw data, or both may be passed along to the cloud 2300 through the gateways 2304. The sensors 2328 may be full IoT devices 2302, for example, capable of both collecting data and processing the data. In some cases, the sensors 2328 may be more limited in functionality, for example, collecting the data and enabling the data aggregators 2326 or gateways 2304 to process the data.

Communications from any IoT device 2302 may be passed along a convenient path (e.g., a most convenient path) between any of the IoT devices 2302 to reach the gateways 2304. In these networks, the number of interconnections provide substantial redundancy, enabling communications to be maintained, even with the loss of a number of IoT devices 2302. Further, the use of a mesh network may enable IoT devices 2302 that are very low power or located at a distance from infrastructure to be used, as the range to connect to another IoT device 2302 may be much less than the range to connect to the gateways 2304.

The fog 2320 provided from these IoT devices 2302 may be presented to devices in the cloud 2300, such as a server 2306, as a single device located at the edge of the cloud 2300, e.g., a fog device. In this example, the alerts coming from the fog device may be sent without being identified as coming from a specific IoT device 2302 within the fog 2320. In this fashion, the fog 2320 may be considered a distributed platform that provides computing and storage resources to perform processing or data-intensive tasks such as data analytics, data aggregation, and machine-learning, among others.

In some examples, the IoT devices 2302 may be configured using an imperative programming style, e.g., with each IoT device 2302 having a specific function and communication partners. However, the IoT devices 2302 forming the fog device may be configured in a declarative programming style, enabling the IoT devices 2302 to reconfigure their operations and communications, such as to determine needed resources in response to conditions, queries, and device failures. As an example, a query from a user located at a server 2306 about the operations of a subset of equipment monitored by the IoT devices 2302 may result in the fog 2320 device selecting the IoT devices 2302, such as particular sensors 2328, needed to answer the query. The data from these sensors 2328 may then be aggregated and analyzed by any combination of the sensors 2328, data aggregators 2326, or gateways 2304, before being sent on by the fog 2320 device to the server 2306 to answer the query. In this example. IoT devices 2302 in the fog 2320 may select the sensors 2328 used based on the query, such as adding data from flow sensors or temperature sensors. Further, if some of the IoT devices 2302 are not operational, other IoT devices 2302 in the fog 2320 device may provide analogous data, if available.

In other examples, the operations and functionality described above may be embodied by an IoT device machine in the example form of an electronic processing system, within which a set or sequence of instructions may be executed to cause the electronic processing system to perform any one of the methodologies discussed herein, according to an example embodiment. The machine may be an IoT device or an IoT gateway, including a machine embodied by aspects of a personal computer (PC), a tablet PC, a personal digital assistant (PDA), a mobile telephone or smartphone, or any machine capable of executing instructions (sequential or otherwise) that specify actions to be taken by that machine.

Further, these and like examples to a processor-based system shall be taken to include any set of one or more machines that are controlled by or operated by a processor, set of processors, or processing circuitry (e.g., a machine in the form of a computer, UE. MEC processing device, IoT processing device, etc.) to individually or jointly execute instructions to perform any one or more of the methodologies discussed herein. Accordingly, in various examples, applicable means for processing (e.g., processing, controlling, generating, evaluating, etc.) may be embodied by such processing circuitry.

Figure 24:
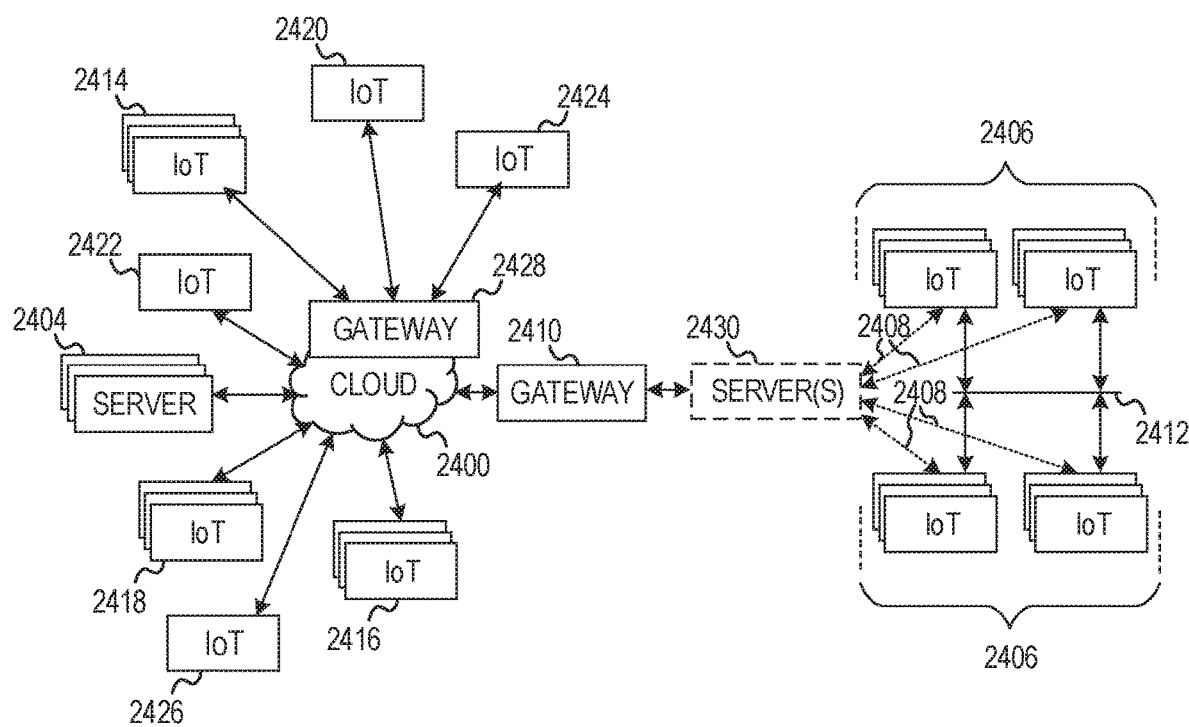
FIG. 24 illustrates a block diagram of a network illustrating communications among a number of IoT/endpoint devices, according to an example.

FIG. 24 illustrates a drawing of a cloud computing network, or cloud 2400, in communication with a number of IoT devices. The cloud 2400 may represent the Internet, or may be a local area network (LAN), or a wide area network (WAN), such as a proprietary network for a company. The IoT devices may include any number of different types of devices, grouped in various combinations. For example, a traffic control group 2406 may include IoT devices along streets in a city. These IoT devices may include stoplights, traffic flow monitors, cameras, weather sensors, and the like. The traffic control group 2406, or other subgroups, may be in communication with the cloud 2400 through wired or wireless links 2408, such as LPWA links, optical links, and the like. Further, a wired or wireless sub-network 2412 may allow the IoT devices to communicate with each other, such as through a local area network, a wireless local area network, and the like. The IoT devices may use another device, such as a gateway 2410 or 2428 to communicate with remote locations such as the cloud 2400; the IoT devices may also use one or more servers 2430 to facilitate communication with the cloud 2400 or with the gateway 2410. For example, the one or more servers 2430 may operate as an intermediate network node to support a local edge cloud or fog implementation among a local area network. Further, the gateway 2428 that is depicted may operate in a cloud-to-gateway-to-many edge devices configuration, such as with the various IoT devices 2414, 2420, 2424 being constrained or dynamic to an assignment and use of resources in the cloud 2400.

Other example groups of IoT devices may include remote weather stations 2414, local information terminals 2416, alarm systems 2418, automated teller machines 2420, alarm panels 2422, or moving vehicles, such as emergency vehicles 2424 or other vehicles 2426, among many others. Each of these IoT devices may be in communication with other IoT devices, with servers 2404, with another IoT fog platform or system, or a combination therein. The groups of IoT devices may be deployed in various residential, commercial, and industrial settings (including in both private or public environments).

As may be seen from FIG. 24, a large number of IoT devices may be communicating through the cloud 2400. This may allow different IoT devices to request or provide information to other devices autonomously. For example, a group of IoT devices (e.g., the traffic control group 2406) may request a current weather forecast from a group of remote weather stations 2414, which may provide the forecast without human intervention. Further, an emergency vehicle 2424 may be alerted by an automated teller machine 2420 that a burglary is in progress. As the emergency vehicle 2424 proceeds towards the automated teller machine 2420, it may access the traffic control group 2406 to request clearance to the location, for example, by lights turning red to block cross traffic at an intersection in sufficient time for the emergency vehicle 2424 to have unimpeded access to the intersection.

Clusters of IoT devices, such as the remote weather stations 2414 or the traffic control group 2406, may be equipped to communicate with other IoT devices as well as with the cloud 2400. This may allow the IoT devices to form an ad-hoc network between the devices, allowing them to function as a single device, which may be termed a fog platform or system (e.g., as described above with reference to FIG. 23).

Figure 25:
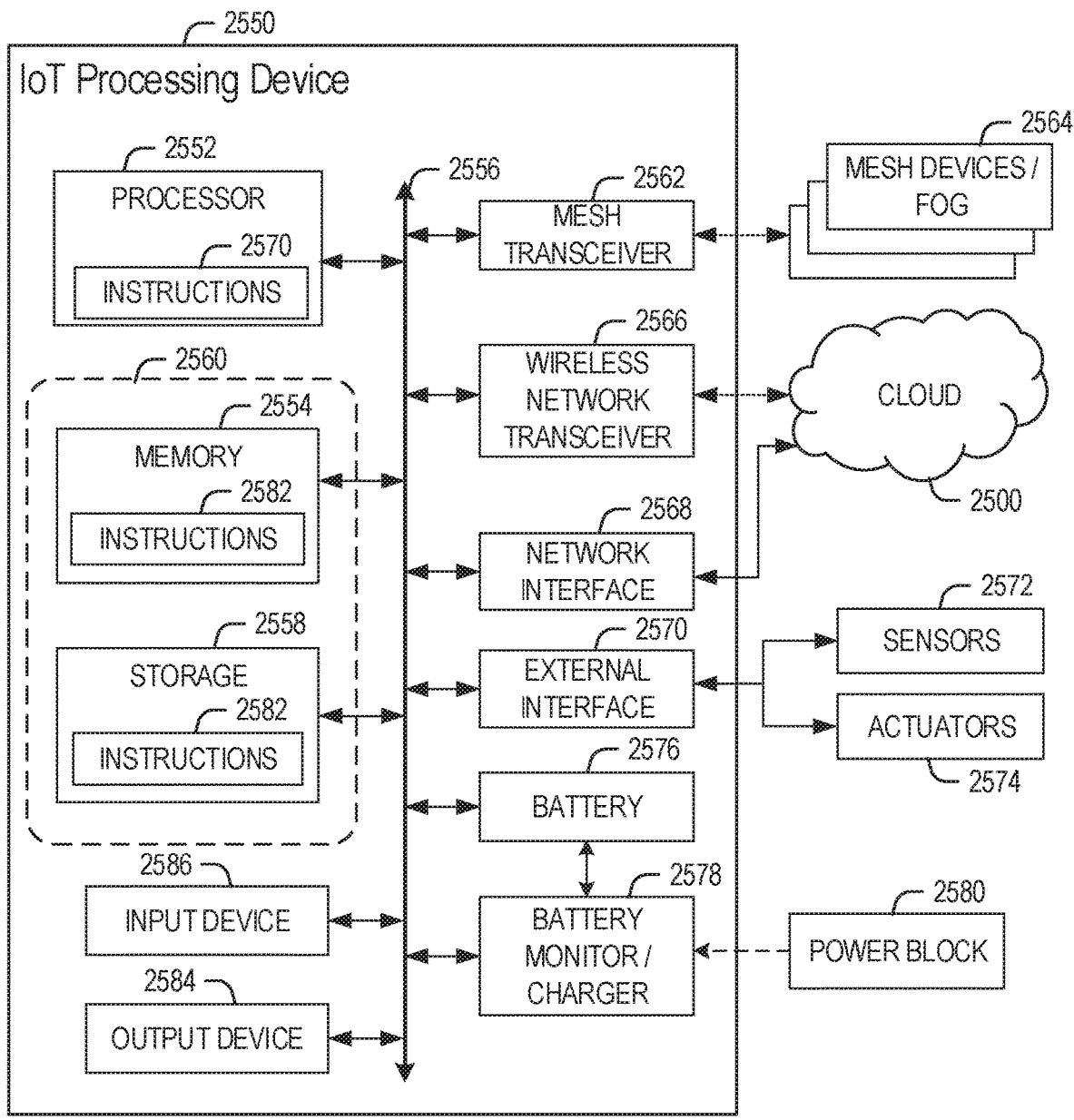
FIG. 25 illustrates a block diagram for an example IoT/endpoint device architecture upon which any one or more of the techniques (e.g., operations, processes, methods, and methodologies) discussed herein may be performed, according to an example.

FIG. 25 is a block diagram of an example of components that may be present in an IoT device 2550 for implementing the techniques described herein. The IoT device 2550 may include any combinations of the components shown in the example or referenced in the disclosure above. The components may be implemented as ICs, portions thereof, discrete electronic devices, or other modules, logic, hardware, software, firmware, or a combination thereof adapted in the IoT device 2550, or as components otherwise incorporated within a chassis of a larger system. Additionally, the block diagram of FIG. 25 is intended to depict a high-level view of components of the IoT device 2550. However, some of the components shown may be omitted, additional components may be present, and different arrangement of the components shown may occur in other implementations.

The IoT device 2550 may include processing circuitry in the form of a processor 2552, which may be a microprocessor, a multi-core processor, a multithreaded processor, an ultra-low voltage processor, an embedded processor, or other known processing elements. The processor 2552 may be a part of a system on a chip (SoC) in which the processor 2552 and other components are formed into a single integrated circuit, or a single package, such as the Edison™ or Galileo™ SoC boards from Intel. As an example, the processor 2552 may include an Intel® Architecture Core™ based processor, such as a Quark™, an Atom™, an i3, an i5, an i7, or an MCU-class processor, or another such processor available from Intel® Corporation, Santa Clara, Calif. However, any number other processors may be used, such as available from Advanced Micro Devices, Inc. (AMD) of Sunnyvale, Calif., a MIPS-based design from MIPS Technologies, Inc. of Sunnyvale, Calif., an ARM-based design licensed from ARM Holdings. Ltd. or customer thereof, or their licensees or adopters. The processors may include units such as an A5-A10 processor from Apple® Inc., a Snapdragon™ processor from Qualcomm® Technologies. Inc., or an OMAP™ processor from Texas Instruments. Inc.

The processor 2552 may communicate with a main memory 2554 over an interconnect 2556 (e.g., a bus). Any number of memory devices may be used to provide for a given amount of system memory. As examples, the memory may be random access memory (RAM) in accordance with a Joint Electron Devices Engineering Council (JEDEC) design such as the DDR or mobile DDR standards (e.g., LPDDR, LPDDR2, LPDDR3, or LPDDR4). In various implementations the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules. e.g., dual inline memory modules (DIMMs) of different varieties including but not limited to microDIMMs or MiniDIMMs.

To provide for persistent storage of information such as data, applications, operating systems and so forth, a storage 2558 may also couple to the processor 2552 via the interconnect 2556. In an example the storage 2558 may be implemented via a solid state disk drive (SSDD). Other devices that may be used for the storage 2558 include flash memory cards, such as SD cards, microSD cards, xD picture cards, and the like, and USB flash drives. In low power implementations, the storage 2558 may be on-die memory or registers associated with the processor 2552. However, in some examples, the storage 2558 may be implemented using a micro hard disk drive (HDD). Further, any number of new technologies may be used for the storage 2558 in addition to, or instead of, the technologies described, such resistance change memories, phase change memories, holographic memories, or chemical memories, among others.

The components may communicate over the interconnect 2556. The interconnect 2556 may include any number of technologies, including industry standard architecture (ISA), extended ISA (EISA), peripheral component interconnect (PCI), peripheral component interconnect extended (PCIx), PCI express (PCIe), or any number of other technologies. The interconnect 2556 may be a proprietary bus, for example, used in a SoC based system. Other bus systems may be included, such as an I2C interface, an SPI interface, point to point interfaces, and a power bus, among others.

The interconnect 2556 may couple the processor 2552 to a mesh transceiver 2562, for communications with other mesh devices 2564. The mesh transceiver 2562 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the mesh devices 2564. For example, a WLAN unit may be used to implement Wi-Fi™ communications in accordance with the Institute of Electrical and Electronics Engineers (IEEE) 802.11 standard. In addition, wireless wide area communications, e.g., according to a cellular or other wireless wide area protocol, may occur via a WWAN unit.

The mesh transceiver 2562 may communicate using multiple standards or radios for communications at different range. For example, the IoT device 2550 may communicate with close devices, e.g., within about 10 meters, using a local transceiver based on BLE, or another low power radio, to save power. More distant mesh devices 2564, e.g., within about 50 meters, may be reached over ZigBee or other intermediate power radios. Both communications techniques may take place over a single radio at different power levels, or may take place over separate transceivers, for example, a local transceiver using BLE and a separate mesh transceiver using ZigBee.

A wireless network transceiver 2566 may be included to communicate with devices or services in the cloud 2500 via local or wide area network protocols. The wireless network transceiver 2566 may be a LPWA transceiver that follows the IEEE 802.15.4, or IEEE 802.15.4g standards, among others. The IoT device 2550 may communicate over a wide area using LoRaWAN™ (Long Range Wide Area Network) developed by Semtech and the LoRa Alliance. The techniques described herein are not limited to these technologies, but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the mesh transceiver 2562 and wireless network transceiver 2566, as described herein. For example, the radio transceivers 2562 and 2566 may include an LTE or other cellular transceiver that uses spread spectrum (SPA/SAS) communications for implementing high speed communications. Further, any number of other protocols may be used, such as Wi-Fi® networks for medium speed communications and provision of network communications.

The radio transceivers 2562 and 2566 may include radios that are compatible with any number of 3GPP (Third Generation Partnership Project) specifications, notably Long Term Evolution (LTE), Long Term Evolution-Advanced (LTE-A), and Long Term Evolution-Advanced Pro (LTE-A Pro). It may be noted that radios compatible with any number of other fixed, mobile, or satellite communication technologies and standards may be selected. These may include, for example, any Cellular Wide Area radio communication technology, which may include e.g. a 5th Generation (5G) communication systems, a Global System for Mobile Communications (GSM) radio communication technology, a General Packet Radio Service (GPRS) radio communication technology, or an Enhanced Data Rates for GSM Evolution (EDGE) radio communication technology, a UMTS (Universal Mobile Telecommunications System) communication technology. In addition to the standards listed above, any number of satellite uplink technologies may be used for the wireless network transceiver 2566, including, for example, radios compliant with standards issued by the ITU (International Telecommunication Union), or the ETSI (European Telecommunications Standards Institute), among others. The examples provided herein are thus understood as being applicable to various other communication technologies, both existing and not yet formulated.

A network interface controller (NIC) 2568 may be included to provide a wired communication to the cloud 2500 or to other devices, such as the mesh devices 2564. The wired communication may provide an Ethernet connection, or may be based on other types of networks, such as Controller Area Network (CAN), Local Interconnect Network (LIN), DeviceNet, ControlNet, Data Highway+, PRO- FIBUS, or PROFINET, among many others. An additional NIC 2568 may be included to enable connect to a second network, for example, a NIC 2568 providing communications to the cloud over Ethernet, and a second NIC 2568 providing communications to other devices over another type of network.

Given the variety of types of applicable communications from the device to another component or network, applicable communications circuitry used by the device may include or be embodied by any one or more of components 2562, 2566, 2568, or 2570. Accordingly, in various examples, applicable means for communicating (e.g., receiving, transmitting, etc.) may be embodied by such communications circuitry.

The interconnect 2556 may couple the processor 2552 to an external interface 2570 that is used to connect external devices or subsystems. The external devices may include sensors 2572, such as accelerometers, level sensors, flow sensors, optical light sensors, camera sensors, temperature sensors, a global positioning system (GPS) sensors, pressure sensors, barometric pressure sensors, and the like. The external interface 2570 further may be used to connect the IoT device 2550 to actuators 2574, such as power switches, valve actuators, an audible sound generator, a visual warning device, and the like.

In some optional examples, various input/output (I/O) devices may be present within, or connected to, the IoT device 2550. For example, a display or other output device 2584 may be included to show information, such as sensor readings or actuator position. An input device 2586, such as a touch screen or keypad may be included to accept input. An output device 2584 may include any number of forms of audio or visual display, including simple visual outputs such as binary status indicators (e.g., LEDs) and multi-character visual outputs, or more complex outputs such as display screens (e.g., LCD screens), with the output of characters, graphics, multimedia objects, and the like being generated or produced from the operation of the IoT device 2550.

A battery 2576 may power the IoT device 2550, although in examples in which the IoT device 2550 is mounted in a fixed location, it may have a power supply coupled to an electrical grid. The battery 2576 may be a lithium ion battery, or a metal-air battery, such as a zinc-air battery, an aluminum-air battery, a lithium-air battery, and the like.

A battery monitor/charger 2578 may be included in the IoT device 2550 to track the state of charge (SoCh) of the battery 2576. The battery monitor/charger 2578 may be used to monitor other parameters of the battery 2576 to provide failure predictions, such as the state of health (SoH) and the state of function (SoF) of the battery 2576. The battery monitor/charger 2578 may include a battery monitoring integrated circuit, such as an LTC4020 or an LTC2990 from Linear Technologies, an ADT7488A from ON Semiconductor of Phoenix Ariz. or an IC from the UCD90xxx family from Texas Instruments of Dallas, Tex. The battery monitor/charger 2578 may communicate the information on the battery 2576 to the processor 2552 over the interconnect 2556. The battery monitor/charger 2578 may also include an analog-to-digital (ADC) convertor that enables the processor 2552 to directly monitor the voltage of the battery 2576 or the current flow from the battery 2576. The battery parameters may be used to determine actions that the IoT device 2550 may perform, such as transmission frequency, mesh network operation, sensing frequency, and the like.

A power block 2580, or other power supply coupled to a grid, may be coupled with the battery monitor/charger 2578 to charge the battery 2576. In some examples, the power block 2580 may be replaced with a wireless power receiver to obtain the power wirelessly, for example, through a loop antenna in the IoT device 2550. A wireless battery charging circuit, such as an LTC4020 chip from Linear Technologies of Milpitas. Calif., among others, may be included in the battery monitor/charger 2578. The specific charging circuits chosen depend on the size of the battery 2576, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 2558 may include instructions 2582 in the form of software, firmware, or hardware commands to implement the techniques described herein. Although such instructions 2582 are shown as code blocks included in the memory 2554 and the storage 2558, it may be understood that any of the code blocks may be replaced with hardwired circuits, for example, built into an application specific integrated circuit (ASIC).

In an example, the instructions 2582 provided via the memory 2554, the storage 2558, or the processor 2552 may be embodied as a non-transitory, machine readable medium 2560 including code to direct the processor 2552 to perform electronic operations in the IoT device 2550. The processor 2552 may access the non-transitory, machine readable medium 2560 over the interconnect 2556. For instance, the non-transitory, machine readable medium 2560 may be embodied by devices described for the storage 2558 or may include specific storage units such as optical disks, flash drives, or any number of other hardware devices. The non-transitory, machine-readable medium 2560 may include instructions to direct the processor 2552 to perform a specific sequence or flow of actions, for example, as described with respect to the flowchart(s) and block diagram(s) of operations and functionality depicted above.

In further examples, a machine-readable medium also includes any tangible medium that is capable of storing, encoding or carrying instructions for execution by a machine and that cause the machine to perform any one or more of the methodologies of the present disclosure or that is capable of storing, encoding or carrying data structures utilized by or associated with such instructions. A "machine-readable medium" thus may include, but is not limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks: magneto-optical disks; and CD-ROM and DVD-ROM disks. The instructions embodied by a machine-readable medium may further be transmitted or received over a communications network using a transmission medium via a network interface device utilizing any one of a number of transfer protocols (e.g., HTTP).

It should be understood that the functional units or capabilities described in this specification may have been referred to or labeled as components or modules, in order to more particularly emphasize their implementation independence. Such components may be embodied by any number of software or hardware forms. For example, a component or module may be implemented as a hardware circuit comprising custom very-large-scale integration (VLSI) circuits or gate arrays, off-the-shelf semiconductors such as logic chips, transistors, or other discrete components. A component or module may also be implemented in programmable hardware devices such as field programmable gate arrays, programmable array logic, programmable logic devices, or the like. Components or modules may also be implemented in software for execution by various types of processors. An identified component or module of executable code may, for instance, comprise one or more physical or logical blocks of computer instructions, which may, for instance, be organized as an object, procedure, or function. Nevertheless, the executables of an identified component or module need not be physically located together, but may comprise disparate instructions stored in different locations which, when joined logically together, comprise the component or module and achieve the stated purpose for the component or module.

Indeed, a component or module of executable code may be a single instruction, or many instructions, and may even be distributed over several different code segments, among different programs, and across several memory devices or processing systems. In particular, some aspects of the described process (such as code rewriting and code analysis) may take place on a different processing system (e.g., in a computer in a data center), than that in which the code is deployed (e.g., in a computer embedded in a sensor or robot). Similarly, operational data may be identified and illustrated herein within components or modules, and may be embodied in any suitable form and organized within any suitable type of data structure. The operational data may be collected as a single data set, or may be distributed over different locations including over different storage devices, and may exist, at least partially, merely as electronic signals on a system or network. The components or modules may be passive or active, including agents operable to perform desired functions. Additional examples of the presently described method, system, and device embodiments include the following, non-limiting configurations. Each of the following non-limiting examples may stand on its own, or may be combined in any permutation or combination with any one or more of the other examples provided below or throughout the present disclosure.

Example 1 is a device, comprising: communications circuitry to communicate with an access network; processing circuitry; and a memory device including instructions embodied thereon, wherein the instructions, which when executed by the processing circuitry, configure the processing circuitry to perform operations to: transmit a request for information to a network (e.g., Multi-Access Edge Computing (MEC)) entity, via the access network, the request transmitted from the device within an operational area of an information service; and receive an object and a tag from the network entity, via the access network, in response to the request for information, the tag including metadata for the object; wherein the object provides data for the information service, and wherein the tag provides the metadata related to a context of the information service and the object from another entity, the another entity located at another location within the operational area of the information service, and the context of the information service being independent from the access network.

In Example 2, the subject matter of Example 1 includes, subject matter where the object is a data object, the data object structured to provide a data output from an information source located in the operational area, and the tag of the data object structured to provide a data type and classification of the data output, the information source being connected to the network entity.

In Example 3, the subject matter of Examples 1-2 includes, subject matter where the object is an application object, the application object structured to enable an application to consume data from an information source located in the operational area and provide an output of data to an information sink located in the operational area, the information source and the information sink being connected to the network entity.

In Example 4, the subject matter of Example 3 includes, subject matter where the tag of the application object specifies requirements for execution of the application, and requirements for the data from the information source.

In Example 5, the subject matter of Examples 1-4 includes, subject matter where the object is a user object, the user object structured to consume data from an application available via the information service, the application being connected to the network entity.

In Example 6, the subject matter of Example 5 includes, subject matter where the tag of the user object specifies data requirements from the application and connectivity information to consume the data from the application via the information service.

In Example 7, the subject matter of Examples 1-6 includes, subject matter where the object has an object type of: a data object type, application object type, or a user object type; wherein the object is linked to a tag of another object via a logical link, the another object having another object type; and wherein the object and the another object are spatially distributed through logical links via at least the access network.

In Example 8, the subject matter of Examples 1-7 includes, subject matter where the object is communicated among multiple entities in access network via interfaces of the access network.

In Example 9, the subject matter of Examples 1-8 includes, the operations further to: transmit the object and the tag to another device in the access network, via the access network, using the network entity.

In Example 10, the subject matter of Example 9 includes, subject matter where the device is included in a first vehicle moving within the operational area, wherein the another device is a second vehicle moving within the operational area, wherein the object and the tag is made available in the operational area while the first vehicle and the second vehicle are mobile within the operational area.

In Example 11, the subject matter of Examples 1-10 includes, subject matter where the device is a mobile computing device, wherein the network entity is a MEC orchestrator, and wherein the access network is a 5G wireless network operating according to a 3GPP standards family standards family.

In Example 12, the subject matter of Examples 1-11 includes, subject matter where use of a MEC application for the information service is based on MEC host information provided in a system information block (SIB) message communicated to the device.

Example 13 is a method, performed by a mobile computing device connected to an access network, comprising: transmitting a request for information to a network (e.g., Multi-Access Edge Computing (MEC)) entity, via the access network, the request transmitted from the device within an operational area of an information service; and; receiving an object and a tag from the network entity, via the access network, in response to the request for information, the tag including metadata for the object; wherein the object provides data for the information service, and wherein the tag provides the metadata related to a context of the information service and the object from another entity, the another entity located at another location within the operational area of the location service, and the context of the information service being independent from the access network.

In Example 14, the subject matter of Example 13 includes, subject matter where the object is a data object, the data object structured to provide a data output from an information source located in the operational area, and the tag of the data object structured to provide a data type and classification of the data output, the information source being connected to the network entity.

In Example 15, the subject matter of Examples 13-14 includes, subject matter where the object is an application object, the application object structured to enable an application to consume data from an information source located in the operational area and provide an output of data to an information sink operational in the operational area, the information source and the information sink being connected to the network entity.

In Example 16, the subject matter of Example 15 includes, subject matter where the tag of the application object specifies requirements for execution of the application, and requirements for the data from the information source.

In Example 17, the subject matter of Examples 13-16 includes, subject matter where the object is a user object, the user object structured to consume data from an application available via the information service, the application being connected to the network entity.

In Example 18, the subject matter of Example 17 includes, subject matter where the tag of the user object specifies data requirements from the application and connectivity information to consume the data from the application via the information service.

In Example 19, the subject matter of Examples 13-18 includes, subject matter where the object has an object type of: a data object type, application object type, or a user object type; wherein the object is linked to a tag of another object via a logical link, the another object having another object type; and wherein the object and the another object are spatially distributed through logical links via at least the access network.

In Example 20, the subject matter of Examples 13-19 includes, subject matter where the object is communicated among multiple entities in access network via interfaces of the access network.

In Example 21, the subject matter of Examples 13-20 includes, transmitting the object and the tag to another device in the access network, via the access network, using the network entity.

In Example 22, the subject matter of Example 21 includes, subject matter where the device is included in a first vehicle moving within the operational area, wherein the another device is a second vehicle moving within the operational area, wherein the object and the tag is made available in the operational area while the first vehicle and the second vehicle are mobile within the operational area.

In Example 23, the subject matter of Examples 13-22 includes, subject matter where the device is a mobile computing device, wherein the network entity is a MEC orchestrator, and wherein the access network is a 5G wireless network operating according to a 3GPP standards family.

In Example 24, the subject matter of Examples 13-23 includes, subject matter where use of a MEC application for the information service is based on MEC host information provided in a system information block (SIB) message communicated to the device.

Example 25 is at least one machine-readable storage medium including instructions, wherein the instructions, when executed by a processing circuitry of a computing device, cause the processing circuitry to perform operations of any of Examples 13 to 24.

Example 26 is an apparatus comprising means for performing any of the methods of Examples 13 to 24.

Example 27 is a system, comprising: a user equipment (UE) device, comprising communications circuitry to communicate via an access network, and processing circuitry configured to: transmit a request for information, via the access network, the request transmitted from the device within an operational area of an information service; and receive an object and a tag, in response to the request for information, the tag including metadata for the object; and a network (e.g., MEC) entity device, comprising communications circuitry to communicate via the access network, and processing circuitry configured to: receive the request for information, via the access network; and transmit the object and the tag, to the UE device, in response to the request for information.

In Example 28, the subject matter of Example 27 includes, subject matter where the network entity device operates a MEC orchestrator and a MEC platform manager, the MEC orchestrator configured to assign objects among the MEC platform manager, one or more MEC application devices, and one or more UEs of the access network.

In Example 29, the subject matter of Examples 27-28 includes, a MEC application device, the MEC application device configured to communicate the object and the tag to the MEC entity device in response to the request for information.

In Example 30, the subject matter of Examples 27-29 includes, subject matter where the object has an object type of: a data object type, application object type, or a user object type: wherein the object is linked to a tag of another object via a logical link, the another object having another object type; and wherein the object and the another object are spatially distributed through logical links via at least the access network.

In Example 31, the subject matter of Examples 27-30 includes, subject matter where the request is received via a Mm5 or Mp1 network interface between the UE device and the MEC entity device.

In Example 32, the subject matter of Examples 27-31 includes, the processing circuitry of the network entity device further configured to provide a broadcast to request the object and the tag within the operational area of the information service.

Example 33 is a network entity device, comprising: communications circuitry to communicate with an access network; processing circuitry; and a memory device including instructions embodied thereon, wherein the instructions, which when executed by the processing circuitry, configure the processing circuitry to perform operations to: receive a request for information from a user equipment (UE) device, via the access network, the request received from the device within an operational area of an information service; and transmit an object and a tag to the UE device, via the access network, in response to the request for information, the tag including metadata for the object; wherein the object provides data for the information service, and wherein the tag provides the metadata related to a context of the information service and the object from another entity at another location in the operational area, the context of the information service being independent from the access network.

In Example 34, the subject matter of Example 33 includes, subject matter where the object is a data object, the data object structured to provide a data output from an information source in the operational area, and the tag of the data object structured to provide a data type and classification of the data output, the information source being connected to the network entity.

In Example 35, the subject matter of Examples 33-34 includes, subject matter where the object is an application object, the application object structured to enable an application to consume data from an information source in the operational area and provide an output of data to an information sink in the operational area, the information source and the information sink being connected to the network entity.

In Example 36, the subject matter of Example 35 includes, subject matter where the tag of the application object specifies requirements for execution of the application, and requirements for the data from the information source.

In Example 37, the subject matter of Examples 33-36 includes, subject matter where the object is a user object, the user object structured to consume data from an application available via the information service, the application being connected to the network entity.

In Example 38, the subject matter of Example 37 includes, subject matter where the tag of the user object specifies data requirements from the application and connectivity information to consume the data from the application via the information service.

In Example 39, the subject matter of Examples 33-38 includes, subject matter where the object has an object type of: a data object type, application object type, or a user object type: wherein the object is linked to a tag of another object via a logical link, the another object having another object type; and wherein the object and the another object are spatially distributed through logical links via at least the access network.

In Example 40, the subject matter of Examples 33-39 includes, subject matter where the object is communicated among multiple entities in access network via interfaces of the access network.

In Example 41, the subject matter of Examples 33-40 includes, the operations further to: transmit the object and the tag to another device in the access network, via the access network, using the network entity.

In Example 42, the subject matter of Example 41 includes, subject matter where the device is included in a first vehicle moving within the operational area, wherein the another device is a second vehicle moving within the operational area, wherein the object and the tag is made available in the operational area while the first vehicle and the second vehicle are mobile within the operational area.

In Example 43, the subject matter of Examples 33-42 includes, subject matter where the device is a mobile computing device, wherein the network entity is a MEC orchestrator, and wherein the access network is a 5G wireless network operating according to a 3GPP standards family.

In Example 44, the subject matter of Examples 33-43 includes, subject matter where use of a MEC application for the information service is based on MEC host information provided in a system information block (SIB) message communicated to the UE.

Example 45 is a method, performed by a mobile computing device connected to an access network, comprising: transmitting a request for information to a network (e.g., Multi-Access Edge Computing (MEC)) entity, via the access network, the request transmitted from the device within an operational area of an information service; and receiving an object and a tag from the MEC entity, via the access network, in response to the request for information, the tag including metadata for the object; wherein the object provides data for the information service, and wherein the tag provides the metadata related to a context of the information service and the object from another entity at another location in the operational area, the context of the information service being independent from the access network.

In Example 46, the subject matter of Example 45 includes, subject matter where the object is a data object, the data object structured to provide a data output from an information source in the operational area, and the tag of the data object structured to provide a data type and classification of the data output, the information source being connected to the network entity.

In Example 47, the subject matter of Examples 45-46 includes, subject matter where the object is an application object, the application object structured to enable an application to consume data from an information source in the operational area and provide an output of data to an information sink in the operational area, the information source and the information sink being connected to the network entity.

In Example 48, the subject matter of Example 47 includes, subject matter where the tag of the application object specifies requirements for execution of the application, and requirements for the data from the information source.

In Example 49, the subject matter of Examples 45-48 includes, subject matter where the object is a user object, the user object structured to consume data from an application available via the information service, the application being connected to the network entity.

In Example 50, the subject matter of Example 49 includes, subject matter where the tag of the user object specifies data requirements from the application and connectivity information to consume the data from the application via the information service.

In Example 51, the subject matter of Examples 45-50 includes, subject matter where the object has an object type of: a data object type, application object type, or a user object type; wherein the object is linked to a tag of another object via a logical link, the another object having another object type; and wherein the object and the another object are spatially distributed through logical links via at least the access network.

In Example 52, the subject matter of Examples 45-51 includes, subject matter where the object is communicated among multiple entities in access network via interfaces of the access network.

In Example 53, the subject matter of Examples 45-52 includes, transmitting the object and the tag to another device in the access network, via the access network, using the network entity.

In Example 54, the subject matter of Example 53 includes, subject matter where the device is included in a first vehicle moving within the operational area, wherein the another device is a second vehicle moving within the operational area, wherein the object and the tag is made available in the operational area while the first vehicle and the second vehicle are mobile within the operational area.

In Example 55, the subject matter of Examples 45-54 includes, subject matter where the device is a mobile computing device, wherein the network entity is a MEC orchestrator, and wherein the access network is a 5G wireless network operating according to a 3GPP standards family standards family.

In Example 56, the subject matter of Examples 45-54 includes, subject matter where use of a MEC application for the information service is based on MEC host information provided in a system information block (SIB) message communicated to the UE.

Example 57 is at least one machine-readable storage medium including instructions, wherein the instructions, when executed by a processing circuitry of a computing device, cause the processing circuitry to perform operations of any of Examples 45 to 56.

Example 58 is an apparatus comprising means for performing any of the methods of Examples 45 to 56.

Example 59 is a system, comprising: a first device, comprising communications circuitry to communicate via an access network, and processing circuitry configured to: transmit a request for information, via the access network, the request transmitted from the device within an operational area of an information service; and receive an object and a tag, in response to the request for information, the tag including metadata for the object; and a second device, comprising communications circuitry to communicate via the access network, and processing circuitry configured to: receive the request for information, via the access network; and transmit the object and the tag, to the first device, in response to the request for information.

In Example 60, the subject matter of Example 59 includes, subject matter where the first device or the second device is: an infrastructure component, processing element, vehicle, user equipment (UE) device, or network entity.

In Example 61, the subject matter of Examples 59-60 includes, subject matter where the request for information occurs in a mobile context, with the first device and the second device moving within a defined area of the operational area.

In Example 62, the subject matter of Examples 59-61 includes, subject matter where the object has an object type of: a data object type, application object type, or a user object type.

In Example 63, the subject matter of Example 62 includes, subject matter where the object is a data object type, and wherein the object is: a video data object, a LIDAR data object, or a radar data object.

In Example 64, the subject matter of Examples 62-63 subject matter where, wherein the object is an application object type, and wherein the object is: a computational processing object, or a memory object.

In Example 65, the subject matter of Examples 62-64 includes, subject matter where the object is linked to objects of other object types.

In Example 66, the subject matter of Examples 59-65 includes, subject matter where the first and second devices are hosted by vehicles, wherein the respective vehicles offer services via the object.

In Example 67, the subject matter of Example 66 includes, subject matter where the object is operated as a data object in a vehicle, wherein the tag indicates the capabilities of the object, and wherein the object is used to deliver measurement, sensing, or observation data of the vehicle.

In Example 68, the subject matter of Examples 66-67 includes, wherein the object is operated as an application object in a vehicle, wherein the tag indicates the capabilities of the object, and wherein the vehicle operates to receive and process information from one or multiple data object peers, and wherein the vehicle operates to provide the information to one or multiple user objects.

Example 69 is a network comprising respective devices and device communication mediums for performing any of the operations of Examples 1 to 68.

Example 70 is an 4G/5G communications network topology, the network topology comprising respective communication links adapted to perform communications for the operations of any of Examples 1 to 68.

Example 71 is an edge cloud computing device implementation comprising processing nodes and computing units adapted for performing any of the operations of Examples 1 to 68.

Example 72 is an ETSI MEC system implementation comprising devices, processing nodes, and computing units adapted for performing any of the operations of Examples 1 to 68.

Example 73 is an edge cloud network platform comprising physical and logical computing resources adapted for performing any of the operations of Examples 1 to 68.

Example 74 is an apparatus comprising means for performing any of the operations of Examples 1 to 68.

Example 75 is a system to perform the operations of any of Examples 1 to 68.

In the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment.

What is claimed is:

1. A device, comprising:
communications circuitry to communicate with an access network;
processing circuitry; and
a memory device including instructions embodied thereon, wherein the instructions, which when executed by the processing circuitry, configure the processing circuitry to perform operations to:
transmit a request for information to a Multi-Access Edge Computing (MEC) entity, via the access network, the request transmitted from the device within an operational area in which an information service is available; and
receive an object and a tag from the MEC entity, via the access network, in response to the request for information;
wherein the object provides data for the information service, and wherein the tag provides metadata related to a context of the information service and the object from another entity, the metadata including information on accessing the information service, the another entity located at another location within the operational area, and the context of the information service being independent from the access network.

2. The device of claim 1, wherein the object is a data object, the data object structured to provide a data output from an information source located in the operational area, and the tag of the data object structured to provide a data type and classification of the data output, the information source being connected to the MEC entity.

3. The device of claim 1, wherein the object is an application object, the application object structured to enable an application to consume data from an information source located in the operational area and provide an output of data to an information sink located in the operational area, the information source and the information sink being connected to the MEC entity.

4. The device of claim 3, wherein the tag of the application object specifies requirements for execution of the application, and requirements for the data from the information source.

5. The device of claim 1, wherein the object is a user object, the user object structured to consume data from an application available via the information service, the application being connected to the MEC entity.

6. The device of claim 5, wherein the tag of the user object specifies data requirements from the application and connectivity information to consume the data from the application via the information service.

7. The device of claim 1, wherein the object has an object type of: a data object type, application object type, or a user object type;
wherein the object is linked to a tag of another object via a logical link, the another object having another object type; and
wherein the object and the another object are spatially distributed through logical links via at least the access network.

8. The device of claim 1, wherein the object is communicated among multiple entities in the access network via interfaces of the access network.

9. The device of claim 1, the operations further to:
transmit the object and the tag to another device in the access network, via the access network, using the MEC entity.

10. The device of claim 9, wherein the device is included in a first vehicle moving within the operational area, wherein the another device is a second vehicle moving within the operational area, wherein the object and the tag is made available in the operational area while the first vehicle and the second vehicle are mobile within the operational area.

11. The device of claim 1, wherein the device is a mobile computing device, wherein the MEC entity is a MEC orchestrator, and wherein the access network is a 5G wireless network operating according to a 3GPP standards family.

12. The device of claim 1, wherein use of a MEC application for the information service is based on MEC host information provided in a system information block (SIB) message communicated to the device.

13. A method, performed by a mobile computing device connected to an access network, comprising:
transmitting a request for information to a Multi-Access Edge Computing (MEC) entity, via the access network, the request transmitted from the mobile computing device within an operational area in which an information service is available; and;
receiving an object and a tag from the MEC entity, via the access network, in response to the request for information;
wherein the object provides data for the information service, and wherein the tag provides metadata related to a context of the information service and the object from another entity, the metadata including information on accessing the information service, the another entity located at another location within the operational area, and the context of the information service being independent from the access network.

14. The method of claim 13, wherein the object is a data object, the data object structured to provide a data output from an information source located in the operational area, and the tag of the data object structured to provide a data type and classification of the data output, the information source being connected to the MEC entity.

15. The method of claim 14, wherein the object is an application object, the application object structured to enable an application to consume data from an information source located in the operational area and provide an output of data to an information sink operational in the operational area, the information source and the information sink being connected to the MEC entity.

16. The method of claim 15, wherein the tag of the application object specifies requirements for execution of the application, and requirements for the data from the information source.

17. The method of claim 13, wherein the object is a user object, the user object structured to consume data from an application available via the information service, the application being connected to the MEC entity.

18. The method of claim 17, wherein the tag of the user object specifies data requirements from the application and connectivity information to consume the data from the application via the information service.

19. The method of claim 13, wherein the object has an object type of: a data object type, application object type, or a user object type;
wherein the object is linked to a tag of another object via a logical link, the another object having another object type; and
wherein the object and the another object are spatially distributed through logical links via at least the access network.

20. The method of claim 13, wherein the object is communicated among multiple entities in the access network via interfaces of the access network.

21. The method of claim 13, further comprising:
transmitting the object and the tag to another mobile computing device in the access network, via the access network, using the MEC entity.

22. The method of claim 21, wherein the mobile computing device is included in a first vehicle moving within the operational area, wherein the another mobile computing device is a second vehicle moving within the operational area, wherein the object and the tag is made available in the operational area while the first vehicle and the second vehicle are mobile within the operational area.

23. The method of claim 13, wherein use of a MEC application for the information service is based on MEC host information provided in a system information block (SIB) message communicated to the mobile computing device.

24. At least one non-transitory machine-readable storage medium including instructions, wherein the instructions, when executed by a processing circuitry of a computing device, cause the processing circuitry to perform operations comprising:
transmitting a request for information to a Multi-Access Edge Computing (MEC) entity, via an access network, the request transmitted from the computing device within an operational area in which an information service is available; and;
receiving an object and a tag from the MEC entity, via the access network, in response to the request for information;
wherein the object provides data for the information service, and wherein the tag provides metadata related to a context of the information service and the object from another entity, the metadata including information on accessing the information service, the another entity located at another location within the operational area, and the context of the information service being independent from the access network.

25. The at least one non-transitory machine-readable storage medium of claim 24, wherein the object has an object type of: a data object type, application object type, or a user object type;
- wherein the object is linked to a tag of another object via a logical link, the another object having another object type;
- wherein the object and the another object are spatially distributed through logical links via at least the access network; and
- wherein the object is communicated among multiple entities in the access network via interfaces of the access network.

* * * * *

UNITED STATES PATENT AND TRADEMARK OFFICE
CERTIFICATE OF CORRECTION

| | |
|---|---|
| PATENT NO. | : 11,258,873 B2 |
| APPLICATION NO. | : 16/646486 |
| DATED | : February 22, 2022 |
| INVENTOR(S) | : Mueck et al. |

It is certified that error appears in the above-identified patent and that said Letters Patent is hereby corrected as shown below:

In the Claims

In Column 45, Line 52, in Claim 13, delete "and;" and insert --and-- therefor

In Column 46, Line 58, in Claim 24, delete "and;" and insert --and-- therefor

Signed and Sealed this
Twenty-sixth Day of April, 2022

Katherine Kelly Vidal
*Director of the United States Patent and Trademark Office*